United States Patent
Li et al.

(10) Patent No.: US 10,594,450 B2
(45) Date of Patent: Mar. 17, 2020

(54) ASYMMETRIC OFDMA TONE MAPPING AND DYNAMIC CHANNEL ACCESS USING NON-PRIMARY CHANNELS

(71) Applicant: Apple Inc., Cupertino, CA (US)

(72) Inventors: Guoqing Li, Campbell, CA (US); Oren Shani, Saratoga, CA (US); Matthew L. Semersky, San Jose, CA (US); Ashok Ranganath, Cupertino, CA (US); Jarkko L. Kneckt, Campbell, CA (US); Christiaan A. Hartman, San Jose, CA (US); Yong Liu, Campbell, CA (US); Su Khiong Yong, Palo Alto, CA (US); Joonsuk Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/432,758

(22) Filed: Feb. 14, 2017

(65) Prior Publication Data
US 2017/0237532 A1 Aug. 17, 2017

Related U.S. Application Data

(60) Provisional application No. 62/301,579, filed on Feb. 29, 2016, provisional application No. 62/295,391, filed on Feb. 15, 2016.

(51) Int. Cl.
*H04W 72/04* (2009.01)
*H04L 5/00* (2006.01)
(Continued)

(52) U.S. Cl.
CPC ......... *H04L 5/0007* (2013.01); *H04B 7/0452* (2013.01); *H04L 27/2666* (2013.01);
(Continued)

(58) Field of Classification Search
CPC .. H04L 5/0007; H04W 72/04; H04W 72/044; H04W 72/0453; H04W 72/048
See application file for complete search history.

(56) References Cited

U.S. PATENT DOCUMENTS

| 2016/0050672 A1* | 2/2016 | Chen | H04W 72/06 370/329 |
| 2016/0105836 A1* | 4/2016 | Seok | H04W 72/042 370/331 |

(Continued)

FOREIGN PATENT DOCUMENTS

| WO | WO-2016003195 A1 * | 1/2016 | ........... H04W 84/12 |
| WO | WO-2016068669 A1 * | 5/2016 | ............... H04L 5/00 |

*Primary Examiner* — Scott M Sciacca
(74) *Attorney, Agent, or Firm* — Dickinson Wright RLLP

(57) ABSTRACT

An electronic device communicates frames with an access point (AP) by receiving, from the AP, a frame header that includes information specifying a first set of tones of an OFDMA communication, the first set of tones associated with first resource block subchannels having a first bandwidth used by the AP to transmit a frame payload. The electronic device obtains a second set of tones associated with second resource block subchannels having a second bandwidth that differs from the first bandwidth, and receives the frame payload using the OFDMA communication, the second resource block subchannels, and the second set of tones. Alternatively, an electronic device dynamically switches a channel-access mode when communicating a frame with the AP depending on whether the communication includes a primary 20 MHz channel. In a technique, an MU-PPDU is communicated using a frame via a non-primary 20 MHz channel without using the primary 20 MHz channel.

20 Claims, 13 Drawing Sheets

(51) Int. Cl.
  *H04L 27/26* (2006.01)
  *H04B 7/0452* (2017.01)
  *H04L 29/08* (2006.01)
  *H04W 72/12* (2009.01)
  *H04W 88/02* (2009.01)
  *H04W 84/12* (2009.01)

(52) U.S. Cl.
  CPC ......... *H04L 69/323* (2013.01); *H04W 72/121* (2013.01); *H04W 84/12* (2013.01); *H04W 88/02* (2013.01)

(56) References Cited

U.S. PATENT DOCUMENTS

| | | | |
|---|---|---|---|
| 2016/0165574 A1* | 6/2016 | Chu | H04L 5/0007 370/312 |
| 2017/0135087 A1* | 5/2017 | Kim | H04W 84/12 |
| 2017/0339673 A1* | 11/2017 | Choi | H04L 5/00 |
| 2018/0184454 A1* | 6/2018 | Viger | H04W 74/0808 |
| 2018/0302194 A1* | 10/2018 | Wang | H04L 1/1635 |

* cited by examiner

ASYMMETRIC OFDMA TONE MAPPING AND DYNAMIC CHANNEL ACCESS USING NON-PRIMARY CHANNELS

CROSS-REFERENCE TO RELATED APPLICATIONS

This application claims the benefit of U.S. Provisional Patent Application No. 62/295,391, entitled "ASYMMETRIC TRANSMIT-RECEIVE BANDWIDTH OFDMA TONE MAPPING," by Joonsuk Kim et al., filed on Feb. 15, 2016, and the benefit of U.S. Provisional Patent Application No. 62/301,579, entitled "DYNAMIC CHANNEL-ACCESS TECHNIQUE USING NON-PRIMARY CHANNELS", by Guoqing Li et al., filed on Feb. 29, 2016, the contents of both of which are incorporated by reference herein in their entirety for all purposes.

FIELD

The described embodiments relate to wireless communications among electronic devices in a wireless local area network (WLAN), including systems and techniques for mapping tones associated with Orthogonal Frequency Division Multiple Access (OFDMA) so that an electronic device can transmit and receive packets using different bandwidths, and systems and techniques for performing channel access with an electronic device that transmits or receives using one or more non-primary channels without using a primary channel.

BACKGROUND

Many electronic devices communicate with each other using wireless local area networks (WLANs), such as those based on a communication protocol that is compatible with an IEEE 802.11 standard (which is sometimes referred to as 'Wi-Fi'). For example, in some IEEE 802.11 standards, electronic devices communicate with each other using Orthogonal Frequency Division Multiple Access (OFDMA) communication. During the OFDMA communication, resource block subchannels (which are sometimes referred to as 'resource units') and associated tones (such as pilot tones and data tones) are used to communicate payloads in frames. Note that a given configuration or arrangement of resource block subchannels and associated tones correspond to a particular bandwidth.

In existing and proposed IEEE 802.11 standards, the bandwidth used by a transmitting electronic device (such as an access point) and the bandwidth used by a receiving electronic device are typically the same. For example, the receiving electronic device may be required to use the same bandwidth as the transmitting electronic device when receiving frames from the transmitting electronic device. However, this constraint can be very limiting. In particular, if the receiving electronic device is allocated a smaller bandwidth than the transmitting electronic device, the receiving electronic device may need to use the bandwidth allocated to the transmitting electronic device in order to receive frames transmitted by the transmitting electronic device, and then may discard the extra additional bandwidth (which is unused). This inefficient approach may be needed because the tones associated with different resource block subchannels (and, thus, with different bandwidths) may be incompatible with each other.

Furthermore, if a receiving electronic device is unable to operate at a larger bandwidth associated with a transmitting electronic device in a WLAN, then the receiving electronic device may be unable to communicate with the transmitting electronic device. This may be frustrating to users of the transmitting electronic device and the receiving electronic device, which may degrade the user experience.

The IEEE 802.11 standards support a variety of channel configurations, including bandwidths of 20, 40, 80, 160 or 80+80 MHz. For wideband operation (e.g., a bandwidth greater than 20 MHz) in a basic service set (BSS), an access point typically selects one of the 20 MHz channels as a primary 20 MHz channel and the remaining channels are secondary (non-primary) 20 MHz channels. For example, for 40 MHz BSS operation, the access point may select a primary 20 MHz channel and a non-primary 20 MHz channel. Moreover, for 80 MHz BSS operation, the access point may select a primary 20 MHz channel and one of the non-primary 20 MHz channels to construct a primary 40 MHz channel, and the remaining non-primary 20 MHz channels may construct a non-primary 40 MHz channel. Similar selections by the access point may be used to construct a primary 80 MHz channel in 160 MHz BSS operation.

During IEEE 802.11 communication, channel access is usually performed via the primary channel using a contention-based channel access technique such as enhanced distributed channel access (EDCA). In particular, before transmitting, an electronic device (or station) may sense the primary channel. Only when the primary channel is free, the electronic device transmits a frame to an access point via at least the primary channel.

Moreover, the electronic device may continue to monitor the primary channel to keep track of the busy/free status of the communication medium. If the electronic device receives a frame from another electronic device on the primary channel, the electronic device may set its network allocation vector based on the duration field in the received frame. Note that the electronic device usually does not decode data that is only communicated on a non-primary channel because the electronic device does not monitor the non-primary channel(s) in existing IEEE 802.11 standards.

Furthermore, as noted previously, transmissions from the electronic device in existing IEEE 802.11 standards typically include the primary channel. An exception is uplink multi-user (UL MU) transmission, which has recently been proposed in the IEEE 802.11ax standard. During UL MU transmission, the access point performs scheduled access and the electronic device is allowed to occupy a portion of the spectrum that does not include the primary channel.

However, the constraint that the communication with the electronic device usually includes the primary channel can be very limiting. In particular, the electronic device may need to use a larger bandwidth than is necessary to convey data, or the electronic device may need to redundantly communicate data in multiple channels and this redundant data may be subsequently discarded. Thus, the lack of flexibility in the channel configuration in the existing or the proposed IEEE 802.11 standards can waste valuable network resources and can increase the power consumption of the electronic device.

In addition, if the electronic device is unable to operate at a larger bandwidth that includes the primary channel, then the electronic device may not be compatible with the existing or the proposed IEEE 802.11 standards and, thus, the electronic device may not be able to communicate with the access point. This may be frustrating to users of the electronic device and the access point, which may degrade the user experience.

SUMMARY

Some embodiments relate to an electronic device that receives a frame from an access point in a WLAN (such as a WLAN that uses IEEE 802.11ax). During operation an interface circuit in the electronic device receives, from the access point, a header for the frame (such as an HE-SIG-B field in a media access control or MAC header), where the header includes information specifying a first set of tones in Orthogonal Frequency Division Multiple Access (OFDMA) communication, and the first set of tones are associated with first resource block subchannels having a first bandwidth used by the access point to transmit a payload in the frame. The interface circuit obtains a second set of tones that are associated with second resource block subchannels having a second bandwidth that is different than the first bandwidth. For example, the second bandwidth may be less than the first bandwidth, and the second set of tones may exclude some tones in the first set of tones so that the second resource block subchannels are compatible with the first resource block subchannels. Subsequently, the interface circuit receives the payload in the frame using the OFDMA communication, the second resource block subchannels, and the second set of tones.

Some embodiments relate to an access point that receives a frame from the electronic device. During operation an interface circuit in the access point receives, from the electronic device, a header for the frame, where the header includes information specifying the second set of tones in the OFDMA communication, and the second set of tones are associated with the second resource block subchannels having the second bandwidth used by the electronic device to transmit the payload in the frame. The interface circuit obtains the first set of tones that are associated with the first resource block subchannels having the first bandwidth that is different than the second bandwidth. Subsequently, the interface circuit receives the payload in the frame using the OFDMA communication, the first resource block subchannels and the first set of tones.

Some embodiments relate to an electronic device that transmits a frame to or receives a frame from an access point in a WLAN (such as a WLAN that uses IEEE 802.11ax). During operation, this electronic device dynamically switches a channel access mode when communicating (i.e., transmitting or receiving) the frame with the access point depending on whether the communication includes a primary channel (such as a primary 20 MHz channel). In particular, an interface circuit in the electronic device uses an access-point-based scheduled-access technique when transmitting or receiving, in a multi-user (MU) physical layer convergence protocol (PLCP) protocol data unit (or MU-PPDU), the frame via a non-primary channel (such as a non-primary 20 MHz channel) and without using the primary 20 MHz channel. Alternatively, the interface circuit may use a contention-based channel access technique (such as enhanced distributed channel access or EDCA) when transmitting or receiving, in a single-user PPDU (or SU-PPDU), the frame via the primary 20 MHz channel, or may use the access-point-based scheduled-access technique when transmitting or receiving, in another MU-PPDU, the frame using the primary 20 MHz channel.

The electronic device may dynamically specify the access-point-based scheduled-access technique with the non-primary 20 MHz channel, the contention-based channel access technique with the primary 20 MHz channel, or the access-point-based scheduled-access technique with the primary 20 MHz channel (which collectively are sometimes referred to as the 'channel access mode') using information included in: a high throughput (HT) control field in a data-frame header, a quality-of-service (QoS) control field in the data-frame header, or a frame-control field in the data-frame header. Alternatively, the information specifying the channel access mode may be included in a control frame or a management frame.

In this way, the electronic device may be non-backwards compatible with other (existing) IEEE 802.11 standards in the access-point-based scheduled-access technique with the non-primary 20 MHz channel, but may be backwards compatible with the other IEEE 802.11 standards in the contention-based channel access technique with the primary 20 MHz channel or the access-point-based scheduled-access technique with the primary 20 MHz channel.

Moreover, when associating with the access point, the electronic device may specify, in an information element in an association request, one or more of: whether the electronic device currently only operates using a bandwidth of 20 MHz, a preferred 20 MHz channel that the electronic device chooses to operate on and whether the electronic device can be assigned by the access point to a non-primary 20 MHz channel. In response, the electronic device may receive an association response from the access point that assigns the electronic device to the primary 20 MHz channel or to a non-primary 20 MHz channel. Subsequently, the electronic device or the access point may renegotiate the channel access mode using one of the techniques described previously to convey information that specifies one or more of: whether the electronic device currently only operates using a bandwidth of 20 MHz, a preferred 20 MHz channel that the electronic device chooses to operate on and whether the electronic device can be assigned by the access point to a non-primary 20 MHz channel. Note that the information may include a channel index and/or a resource unit of a particular 20 MHz channel to be used by the electronic device, which may be the primary 20 MHz channel or the non-primary 20 MHz channel. Moreover, note that, when the electronic device is associating with the access point, the access point may operate with a bandwidth of 20 MHz (which may allow association when the electronic device operates with a bandwidth of 20 MHz).

Furthermore, when using the access-point-based scheduled-access technique with the non-primary 20 MHz channel or the access-point-based scheduled-access technique with the primary 20 MHz channel, the electronic device may receive a trigger frame from the access point with scheduling information that groups the electronic device with at least another electronic device that uses a different 20 MHz channel than the electronic device into the same or a common MU-PPDU. For example, the scheduling information may assign the electronic device and at least the other electronic device to different 20 MHz channels in the MU-PPDU, and the scheduling information may be redundantly communicated in the different 20 MHz channels. Alternatively, the trigger frame may include different scheduling information for the electronic device and at least the other electronic device in different 20 MHz channels.

Other embodiments relate to an access point that transmits a frame to or receives a frame from the electronic device. This access point may perform counterpart operations to those of the electronic device that enable the dynamic specification of the channel access mode, the association with the electronic device, and the transmitting the trigger frame that includes the scheduling information that groups the electronic device with at least the other electronic device.

Other embodiments provide a method for receiving the payload in the frame. This method includes at least some of the aforementioned operations performed by the interface circuit in the electronic device or the access point.

Other embodiments provide a method for communicating a frame. This method includes at least some of the aforementioned operations performed by the interface circuit in the electronic device or the access point.

Other embodiments provide the interface circuit in the electronic device or the access point.

Other embodiments provide a computer-program product for use with the interface circuit in the electronic device or the access point. This computer-program product includes instructions for at least some of the aforementioned operations performed by the interface circuit in the electronic device or the access point.

This Summary is provided merely for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
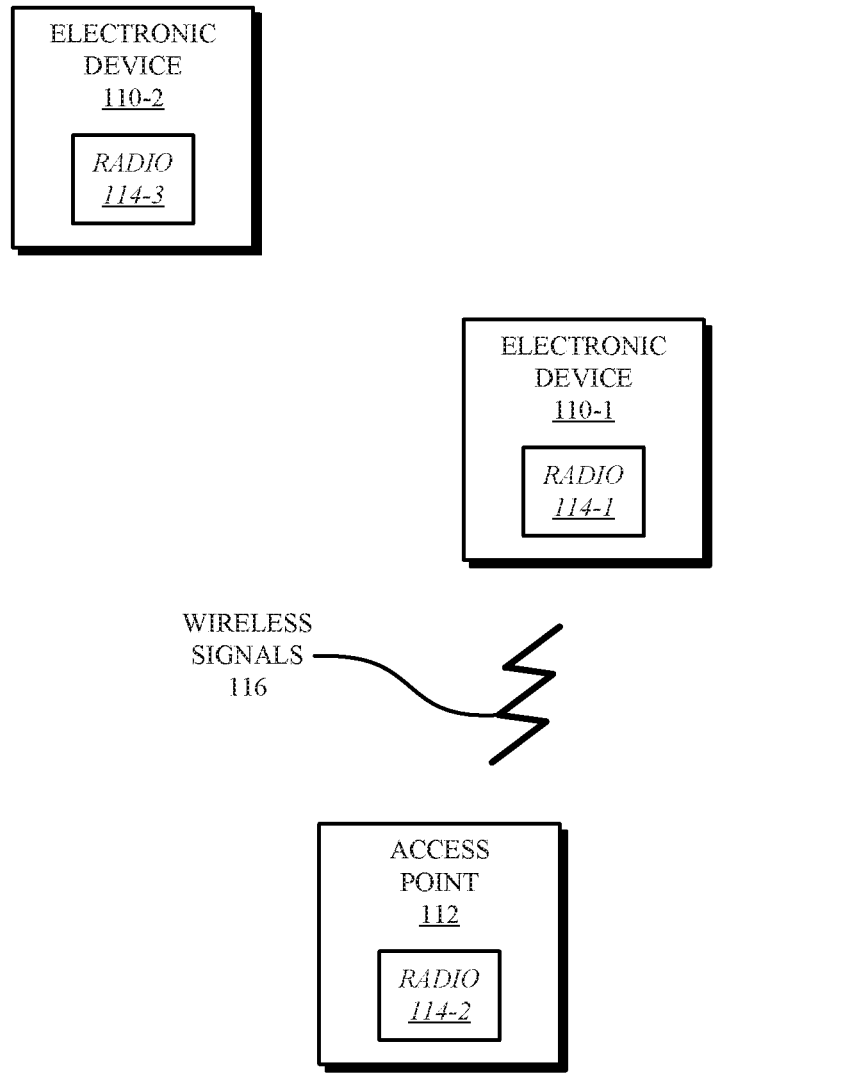
FIG. 1 is a block diagram illustrating an example of electronic devices communicating wirelessly.

Table 1 provides an example of interleaving parameters used in the communication technique during communication between electronic devices, such as the electronic devices of FIG. 1.

Table 2 provides an example of interleaving parameters used in the communication technique during communication between electronic devices, such as the electronic devices of FIG. 1.

Table 3 provides an example of information in the header that is used to convey tones and resource block subchannels used in the communication technique during communication between electronic devices, such as the electronic devices of FIG. 1.

Table 4 provides an example of information in the header that is used to convey tones and resource block subchannels used in the communication technique during communication between electronic devices, such as the electronic devices of FIG. 1.

Note that like reference numerals refer to corresponding parts throughout the drawings. Moreover, multiple instances of the same part are designated by a common prefix separated from an instance number by a dash.

DETAILED DESCRIPTION

Asymmetric Transmit-Receive Bandwidth OFDMA Tone Mapping

A communication technique involving an electronic device that receives a frame from an access point in a WLAN is described. During operation, an interface circuit in the electronic device receives, from the access point, a header for the frame, where the header includes information specifying a first set of tones in Orthogonal Frequency Division Multiple Access (OFDMA) communication, and the first set of tones are associated with first resource block subchannels (or a first resource block subchannel mapping) having a first bandwidth used by the access point to transmit a payload in the frame. Then, the interface circuit obtains a second set of tones that are associated with second resource block subchannels (or a second resource block subchannel mapping) having a second bandwidth that is different than the first bandwidth. Next, the interface circuit receives the payload in the frame using the OFDMA communication, the second resource block subchannels and the second set of tones.

By using the second set of tones to receive the payload that was transmitted using the first set of tones, this communication technique allows the electronic device to use a different bandwidth (i.e., the second bandwidth) to receive the payload than the bandwidth used to transmit the payload (i.e., the first bandwidth). Therefore, the communication technique may avoid wasting resource block subchannels and may reduce the power consumption of the electronic device when receiving the payload. Moreover, because the second set of tones may be compatible with (e.g., aligned with) the first set of tones, the communication technique may allow the electronic device to communicate with the access point (and, more generally, another electronic device). Consequently, the communication technique may facilitate efficient, compatible and lower-power communication, which may improve the user experience when using the electronic device or the access point, and thus may increase customer satisfaction and retention.

Note that the communication technique may be used during wireless communication between electronic devices in accordance with a communication protocol, such as: an Institute of Electrical and Electronics Engineers (IEEE) 802.11 standard (which is sometimes referred to as Wi-Fi). For example, the communication technique may be used with IEEE 802.11ax, which is used as an illustrative example in the discussion that follows. However, this communication technique may also be used with a wide variety of other communication protocols, and in electronic devices (such as electronic devices and, in particular, mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

Thus, in some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. In particular, two to more of electronic devices 110 (such as a smartphone, a laptop computer or a tablet) and access point 112 communicate wirelessly. These electronic devices may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual access point that is implemented on a computer.

Figure 8:
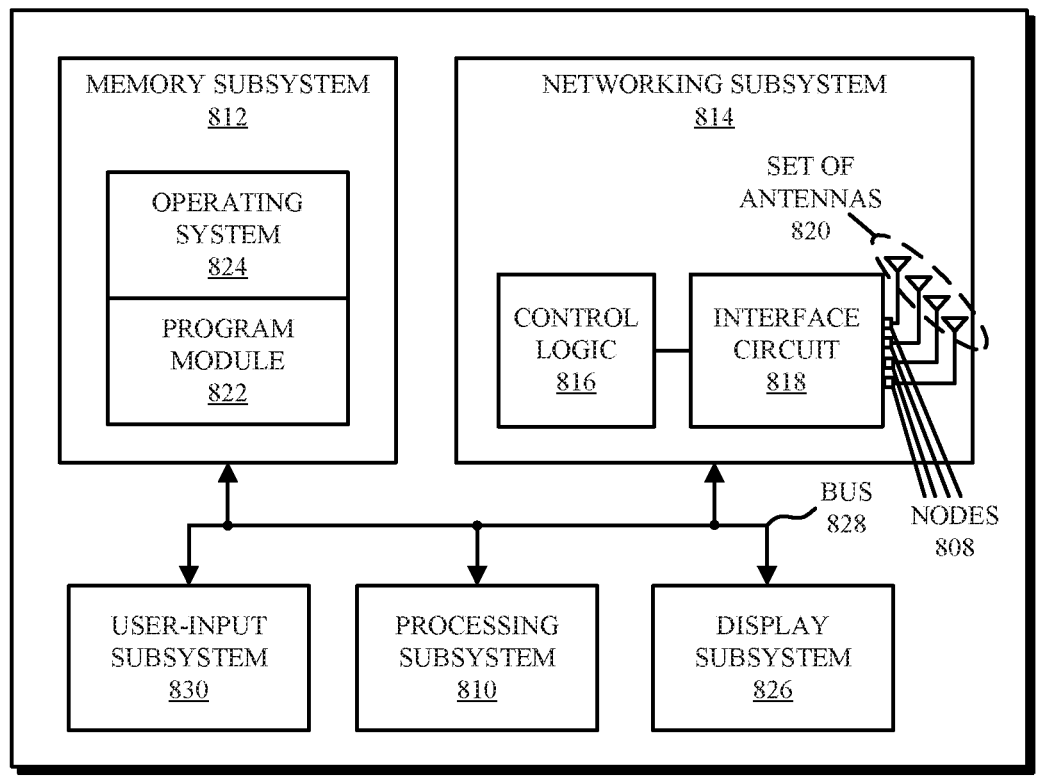
FIG. 8 is a block diagram illustrating an example of one of the electronic devices of FIG. 1.

As described further with reference to FIG. 8, electronic devices 110 and access point 112 may include subsystems, such as a networking subsystem, a memory subsystem and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can comprise transmitting beacons on wireless channels to enable electronic devices to make initial contact with or to detect each other, followed by exchanging subsequent data/management frames (such as connect requests) to establish a connection (which is sometimes referred to as a 'Wi-Fi connection'), configure security options (e.g., IPSec), transmit and receive packets or frames via the connection, etc.

As shown in FIG. 1, wireless signals 116 (represented by a jagged line) are communicated by radios 114-1 and 114-2 in electronic device 110-1 and access point 112, respectively. For example, electronic device 110-1 and access point 112 may exchange packets using a Wi-Fi protocol in a wireless local area network (WLAN).

Figure 2:
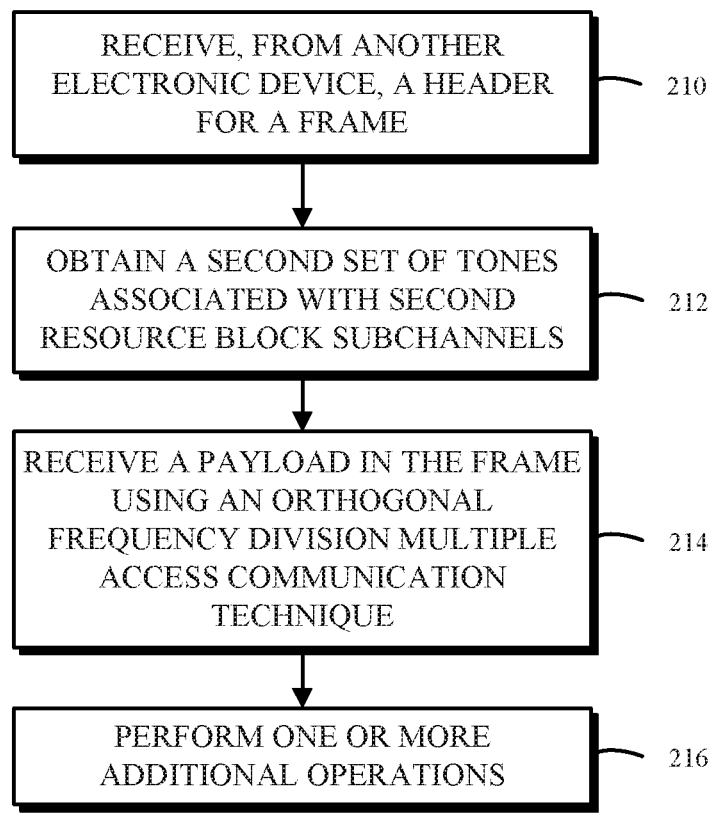
FIG. 2 is a flow diagram illustrating an example of a method for receiving a payload in a frame using one of the electronic devices in FIG. 1.

In particular, as described further below with reference to FIGS. 2 and 3, electronic device 110-1 may receive a header for a frame (such as an HE-SIG-B field in a media access control or MAC header). This header may include information specifying a first set of tones in OFDMA communication, and the first set of tones may be associated with first resource block subchannels having a first bandwidth used by access point 112 to transmit a payload in the frame. Based on the first set of tones and second resource block subchannels having a second (different) bandwidth that are used by electronic device 110-1, electronic device 110-1 may obtain a second set of tones that are associated with the second resource block subchannels. For example, electronic device 110-1 may access the second set of tones (or a difference between the first set of tones and the second set of tones) in memory or locally cached in electronic device 110-1. Alternatively or additionally, electronic device 110-1 may calculate or determine the second set of tones. Note that the second bandwidth may be less than the first bandwidth (such as 20 MHz vs. 40, 80 or 160 MHz), and the second set of tones may exclude some tones in the first set of tones so that the second resource block subchannels are compatible with the first resource block subchannels. Next, electronic device 110-1 may receive the payload in the frame using the OFDMA communication, the second resource block subchannels and the second set of tones.

Similarly, access point 112 may perform these operations when a header for another frame is received from electronic device 110-1. In particular, the header received by access point 112 may include information specifying the second set of tones in the OFDMA communication, and the second set of tones may be associated with the second resource block subchannels having the second bandwidth that was used by electronic device 110-1 to transmit the payload in the other frame. Then, access point 112 may obtain the first set of tones that are associated with the first resource block subchannels having the first bandwidth that is different than the second bandwidth. For example, access point 112 may access the first set of tones (or a difference between the first set of tones and the second set of tones) in memory or locally cached in access point 112 and/or access point 112 may calculate or determine the first set of tones. Next, access point 112 may receive the payload in the frame using the OFDMA communication, the first resource block subchannels and the first set of tones.

Thus, this communication technique may allow electronic device 110-1 and access point 112 to transmit and receive frames or packets using different resource block subchannels and different bandwidths from each other in the WLAN in a manner that is compatible with a Wi-Fi protocol. Consequently, the communication technique may facilitate communication compatibility of electronic device 110-1 and access point 112 (such as when electronic device 110-1 is restricted to using a particular bandwidth, e.g., 20 MHz), may improve the efficiency of the use of channel resources (such as the resource block subchannels), and may reduce power consumption by avoiding unnecessary use of resource block subchannels. These capabilities may improve the performance of electronic device 110-1 and access point 112, and thus may improve the user experience when using electronic device 110-1 and access point 112.

In the described embodiments, processing a packet or frame in one of electronic devices 110 and/or access point 112 includes: receiving wireless signals 116 eoncoding the packet or frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers or types of electronic devices may be present. For example, some embodiments comprise more or fewer electronic devices. As another example, in another embodiment, different electronic devices can be transmitting and/or receiving packets or frames.

We now describe embodiments of a method. FIG. 2 presents a flow diagram illustrating an example method 200 for receiving a payload in a frame in accordance with some embodiments. This method may be performed by an electronic device, such as electronic device 110 or access point 112 in FIG. 1. During operation, the electronic device receives, from another electronic device, a header for a frame (operation 210), where the header includes information specifying a first set of tones in Orthogonal Frequency Division Multiple Access (OFDMA) communication, and the first set of tones are associated with first resource block subchannels (or a first resource block subchannel mapping) having a first bandwidth used by the access point to transmit a payload in the frame. For example, the header may include a media access control (MAC) header and the information may be included in an HE-SIG-B field.

Then, the electronic device obtains a second set of tones (operation 212) that are associated with second resource block subchannels (or a second resource block subchannel mapping) having a second bandwidth that is different than the first bandwidth. For example, the electronic device may access the second set of tones stored in a memory in the electronic device. Note that the second bandwidth may be less than the first bandwidth. In some embodiments, the second bandwidth is 20 MHz. Moreover, the second set of tones may exclude some tones in the first set of tones so that the second resource block subchannels are compatible with the first resource block subchannels. In particular, the tones in the second set of tones may be the same as a subset of the tones in the first set of tones. Furthermore, the second set of tones may be used by a Multi-User Multiple Input Multiple Output (MU-MIMO) group of electronic devices that includes the electronic device. Thus, each of the electronic devices in the MU-MIMO group of electronic devices may use the second set of tones.

Next, the electronic device receives the payload in the frame (operation 214) using the OFDMA communication, the second resource block subchannels and the second set of tones. Note that receiving the payload (operation 214) may involve selecting a number of columns used in data-tone interleaving based on the second resource block subchannels and the second set of tones. Moreover, receiving the payload (operation 214) may involve: receiving wireless signals using an antenna and an interface circuit; converting from analog to digital; removing a cyclic prefix; performing serial-to-parallel conversion; performing an M-point DFT (where M is an integer); performing subcarrier or subchannel demapping and/or equalization; performing an N-point IDFT (where N is an integer and may be less than M); performing parallel-to-serial conversion; and/or detecting the payload.

In some embodiments, the electronic device optionally performs one or more additional operations (operation 216). For example, the electronic device may assemble a second frame with a second header, where the second header includes information specifying the second resource block subchannels and the second set of tones. Then, the electronic device may transmit the second frame using the OFDMA communication, the second resource block subchannels and the second set of tones. Note that the second frame may be assembled and transmitted by a physical layer in the interface circuit and, during operation and prior to assembling the second frame, the physical layer may receive the information from a MAC layer in the interface circuit. Moreover, transmitting the second frame may involve: performing serial-to-parallel conversion; performing an N-point DFT (where N is an integer); performing subcarrier or subchannel mapping; performing an M-point IDFT (where M is an integer and may be greater than N); performing parallel-to-serial conversion; adding a cyclic prefix and/or pulse shaping (e.g., by using a coding technique, such as phase-shift keying); converting from digital to analog; and/or outputting wireless signals using an interface circuit and an antenna.

In some embodiments, the wireless communication in operations 210 and 212 involves an IEEE 802.11 communication protocol or a communication protocol that is compatible with an IEEE 802.11 communication protocol.

In some embodiments of method 200, there may be additional or fewer operations. Moreover, the order of the operations may be changed, and/or two or more operations may be combined into a single operation.

In an exemplary embodiment, at least some of the operations in method 200 are performed by interface circuits in the electronic device and/or the access point. For example, at least some of the operations may be performed by firmware executed by an interface circuit, such as firmware associated with a MAC layer, as well as one or more circuits in a physical layer in the interface circuit.

Figure 3:
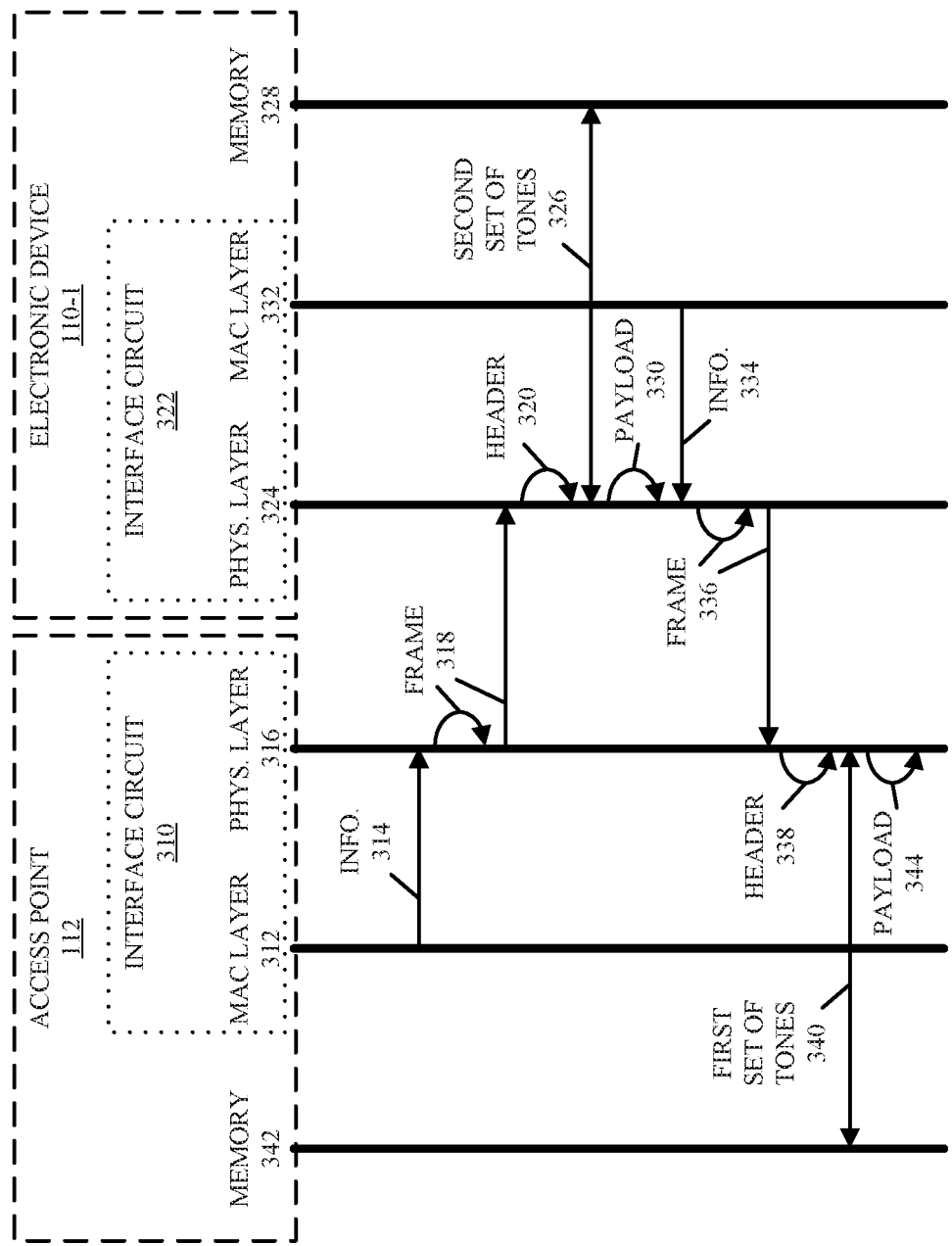
FIG. 3 is a flow diagram illustrating an example of communication between electronic devices, such as the electronic devices of FIG. 1.

The communication technique is further illustrated in FIG. 3, which presents a flow diagram illustrating an example of communication between electronic device 110-1 and access point 112. In particular, a MAC layer 312 in interface circuit 310 in access point 112 may communicate information 314 specifying first resource block subchannels and a first set of tones 340 to physical layer 316, as well as data to be communicated. Then, physical layer 316 may assemble a frame 318 with a header 320, where header 320 includes information 314. Next, physical layer 316 may transmit frame 318 using the OFDMA communication, the first resource block subchannels and the first set of tones 340.

Moreover, physical layer 324 in interface circuit 322 in electronic device 110-1 may receive header 320 for frame 318. Then, physical layer 324 may obtain a second set of tones 326 that are associated with second resource block subchannels from memory 328. (Note that the bidirectional arrow may represent a request to memory 328 and a response from memory 328.) Next, physical layer 324 receives payload 330 (with the data) in frame 318 using the OFDMA communication, the second resource block subchannels and the second set of tones 326.

Subsequently, a MAC layer 332 in interface circuit 322 may communicate information 334 specifying the second resource block subchannels and second set of tones 326 to physical layer 324, as well as additional data to be communicated. Then, physical layer 324 may assemble a frame 336 with a header 338, where the header includes information 334. Next, physical layer 324 may transmit frame 336 using the OFDMA communication, the second resource block subchannels and the second set of tones 326.

Furthermore, physical layer 316 may receive header 338 for frame 336. Then, physical layer 316 may obtain the first set of tones 340 that are associated with the first resource block subchannels from memory 342. (Note that the bidirectional arrow may represent a request to memory 342 and a response from memory 342.) Next, physical layer 316 may receive payload 344 (with the additional data) in frame 336 using the OFDMA communication, the first resource block subchannels and the first set of tones 340.

In these ways, electronic device 110-1 and access point 112 may communicate with each other using different transmit and receive bandwidths in the WLAN using a Wi-Fi-compatible communication protocol.

In an exemplary embodiment, the communication technique is used with an IEEE 802.11 ax communication protocol. This communication protocol may have a predefined tone mapping and pilot locations for 20, 40, 80 and 160 MHz OFDMA. Typically, in existing designs the bandwidth used by a receiving electronic device needs to match (i.e., be the same as) the bandwidth used by the transmitting electronic device. For example, if the transmitting electronic device sends a frame or a packet using 80 MHz OFDMA, a receiving electronic device or station allocated with 20 MHz resource units may need to perform 80 MHz reception. This will involve using a 1024 FFT (or DFT), and then cutting out the extra 60 MHz. Thus, a 20 MHz-only (a 256 FFT or DFT) electronic device usually cannot be an OFDMA physical layer convergence protocol (PLPC) protocol data unit or PPDU recipient when the transmitting electronic device sends an OFDMA frame or packet with more than 20 MHz.

In the disclosed communication technique, the tone mapping for 20 MHz OFDMA may be modified so that it can be used in conjunction with 40, 80 or 160 MHz OFDMA operation. Moreover, the interleaving design may be modified in order to support the new tone mapping. Furthermore, whether the new tone mapping is used or not may be signaled or communicated in the HE-SIG-B field in the header of a frame.

Figure 4:
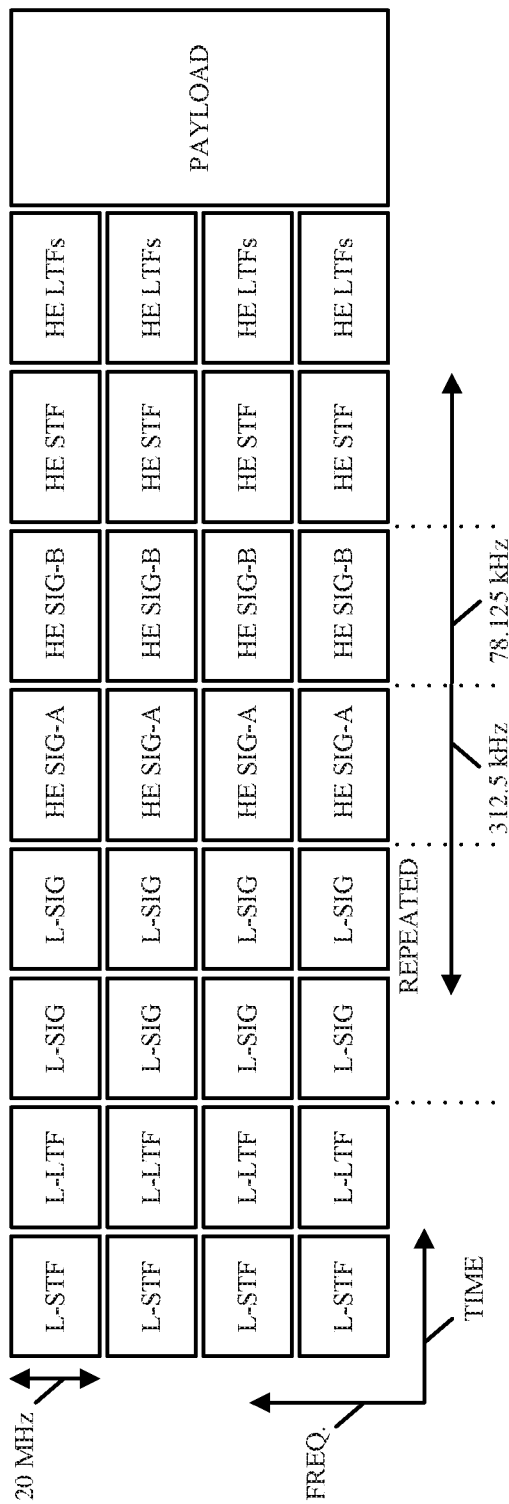
FIG. 4 is a drawing of an example of a preamble in a frame during communication between electronic devices, such as the electronic devices of FIG. 1.

FIG. 4 presents a drawing of an example of a preamble in a frame during communication between electronic devices, such as the electronic devices of FIG. 1. In particular, FIG. 4 illustrates the preamble format or structure in IEEE 802.11ax. Note that the tone mapping and the pilot tone locations for OFDMA may be applied from the HE-STF field, with an increased FFT or DFT size. For example, the number of bits or points in the FFT or DFT may be 256•floor (bandwidth/20), where the bandwidth may be the total bandwidth (in MHz) to operate the OFDMA. However, as noted previously, electronic devices that are not capable of the total bandwidth of operation cannot be recipients of this OFDMA PPDU.

Figure 5:
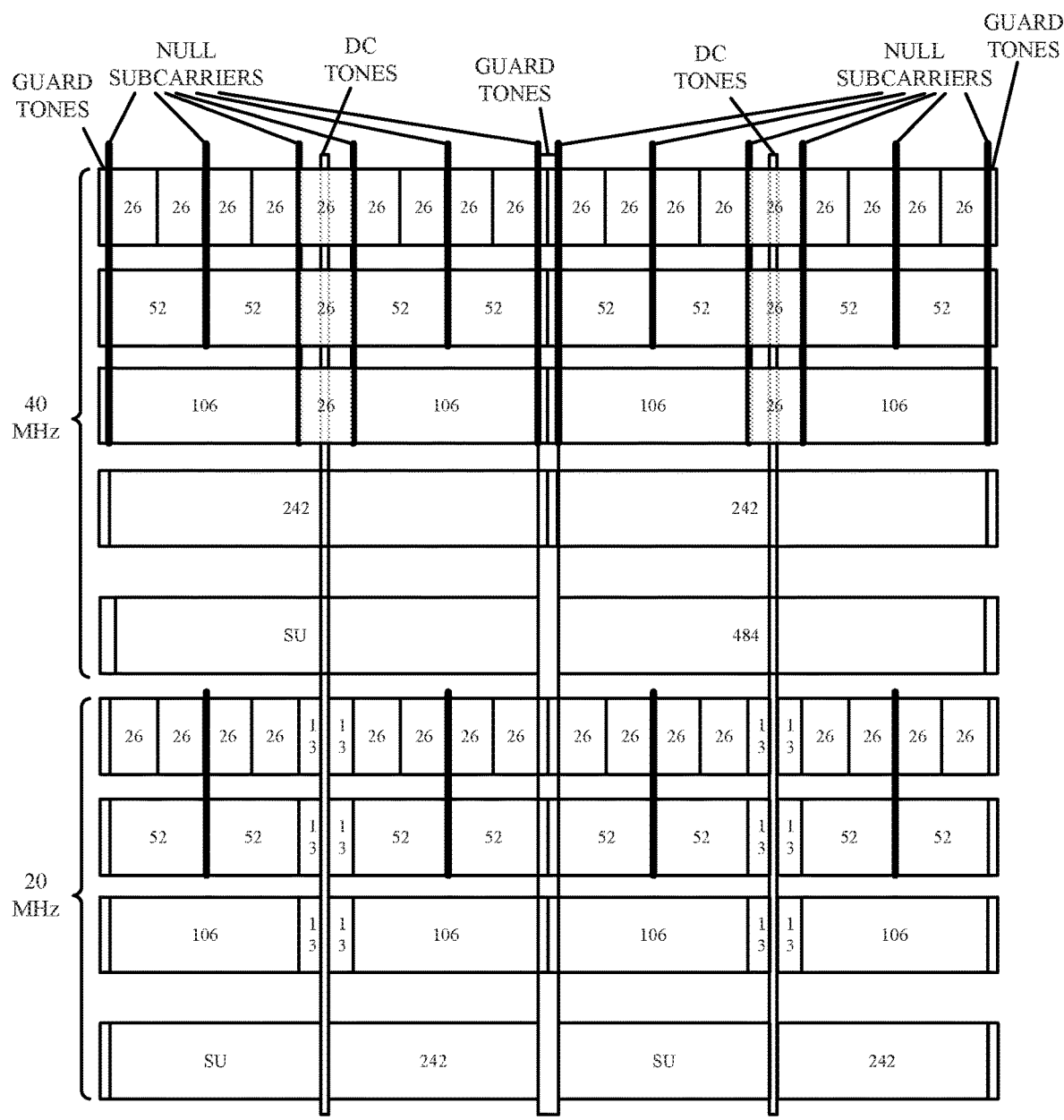
FIG. 5 is a drawing illustrating an example of incompatibility of tones associated with resource block subchannels having different bandwidths during communication between electronic devices, such as the electronic devices of FIG. 1.

FIG. 5 presents a drawing illustrating an example of incompatibility of tones associated with resource block subchannels having different bandwidths during communication between electronic devices, such as the electronic devices of FIG. 1. In particular, the 20 MHz tone mapping is not aligned within the 40 MHz OFDMA operation. For example, there is no DC tone, the guard tones are not aligned and the pilot-tone locations are not aligned. Consequently, it can be difficult to scale the bandwidth of operation in OFDMA.

Figure 6:
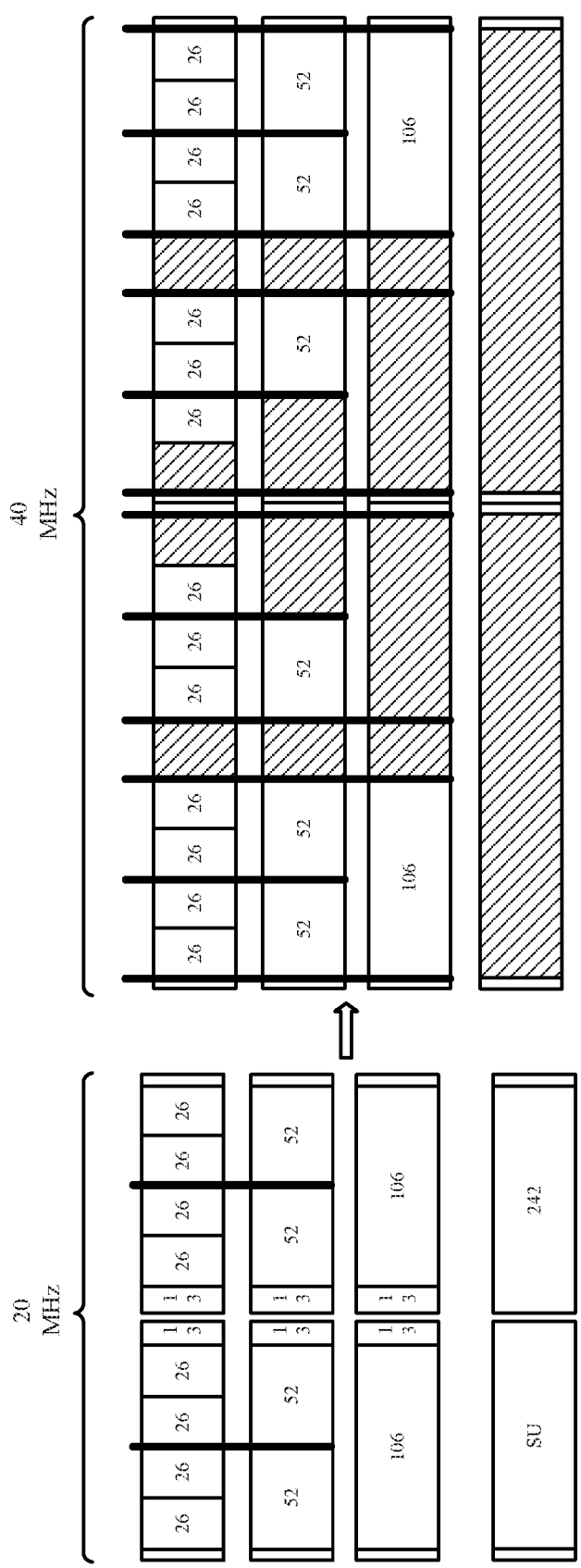
FIG. 6 is a drawing illustrating an example of unused resource block subchannels because of the incompatibility of tones associated with resource block subchannels illustrated in FIG. 5.

The resulting incompatibility is further illustrated in FIG. 6, which presents a drawing illustrating an example of unused resource block subchannels because of the incompatibility of tones associated with resource block subchannels illustrated in FIG. 5. In particular, a 20 MHz-only electronic device (with corresponding receive filtering) may not be able to receive many of the resource units in 40 MHz OFDMA operation (as illustrated by the hashed resource units in FIG. 6). For example, in order to achieve full capability to operate with any resource unit, a 20 MHz-only electronic device may need to operate with the full operating bandwidth of 40 MHz (a 512 FFT or DFT) using the resource block subchannels or the resource units on the left-hand side (lower) 20 MHz band and the right-hand side (upper) 20 MHz band in FIG. 6, and may truncate the lower (or the upper) 20 MHz band. In addition, the incompatibility may adversely affect the implementation of the interface circuit in the electronic device and may result in unnecessary increased power consumption.

Figure 7A:
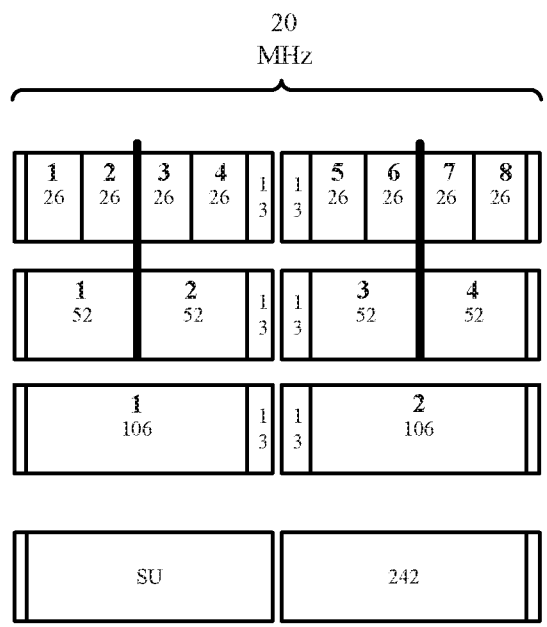
FIGS. 7A, 7B, and 7C illustrate examples of numbering of resource block subchannels for use during communication between electronic devices, such as the electronic devices of FIG. 1.
Figure 7B:
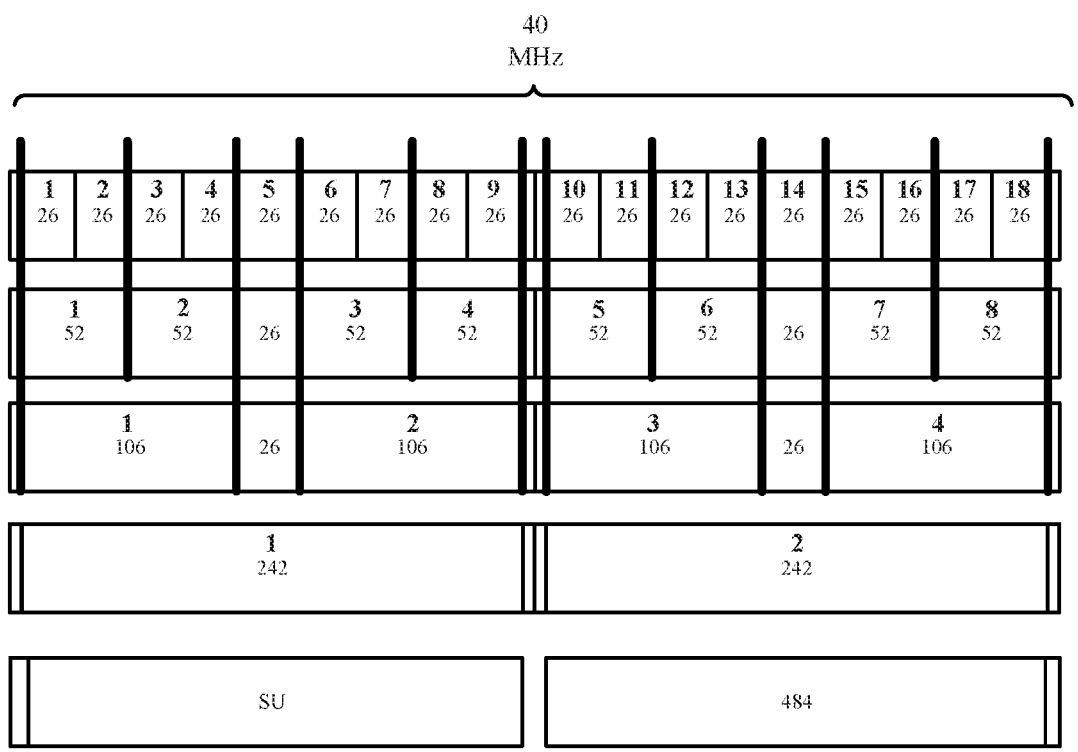
Figure 7C:
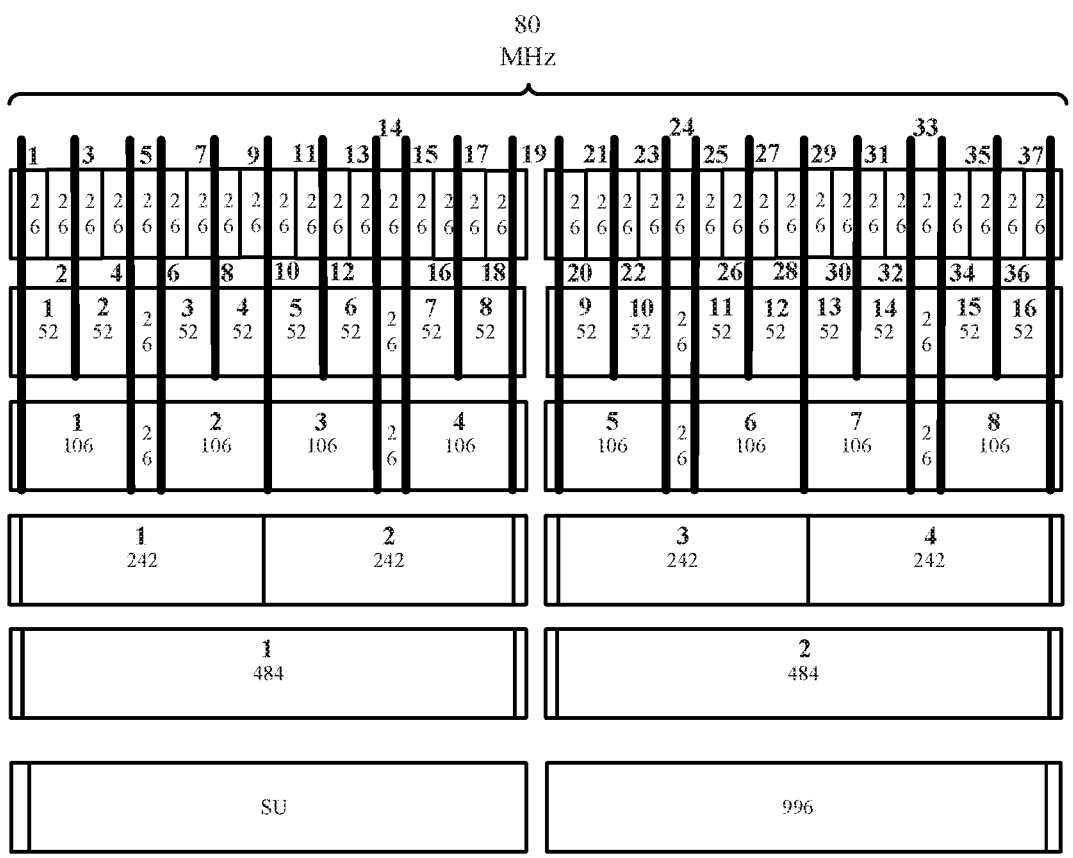

In the proposed communication technique, when a 20 MHz-only electronic device (or an electronic device operating using 20 MHz OFDMA) is a part of OFDMA operation with 40 MHz or higher bandwidth, particular resource units may not be assigned in the 40 MHz operation. For reference, FIGS. 7A, 7B, and 7C present drawings with numbering of the resource block subchannels (or resource units) available for use during communication between electronic devices (such as the electronic devices of FIG. 1), Based on these numbers for the resource block subchannels, for 26-tone resource units, 26-tone resource units 5, 9, 10 and 14 may not be assigned in 40 MHz operation. In addition to these resource units, 26-tone resource units 19, 24, 28, 29 and 33 may not be assigned in 80 MHz operation. Moreover, certain resource units, e.g., for 52-tone resource units, 26-tone resource units 5 and 14 and 52-tone resource units 4 and 5 may not be assigned in 40 MHz operation. In addition to these resource units, further resource units, e.g., 26-tone resource units 19, 24, and 33 and 52-tone resource units 12 and 13 may not be assigned in 80 MHz operation. Furthermore, additional resource units, e.g., for 106-tone resource units, 26-tone resource units 5 and 14 and 106-tone resource units 2 and 3 may not be assigned in 40 MHz operation. In addition to these resource units, other resource units, e.g., 26-tone resource units 19, 24 and 33 and 106-tone resource units 5 and 6 may not be assigned in 80 MHz operation. Additionally, for 242-tone resource units, all the 242-tone resource units and, e.g., 26-tone resource unit 19 (for 80 MHz) may not be assigned.

Using these tones and resource unit assignments (and, thus, without changing the tone mapping), a 20 MHz electronic device may be a part of OFDMA reception. However, this approach may be inefficient and may significantly affect performance by not using such a large number of tones, especially for 106-tone resource units and 242-tone resource units. For example, 25% of the 26-tone resource units, 12.5% of the 52-tone resource units, a significant fraction of the 106-tone resource units and 100% of the 242-tone resource units may be lost. Therefore, in some embodiments the tone mapping is changed for at least two of the preceding cases, such as the 106-tone resource units and the 242-tone resource units. In particular, certain tones may be nulled and the interleaving rules may be modified to accommodate the changes in the total number of data tones.

Because of the incompatibility/misalignment of tones that occurs when a 20 MHz electronic device is used in conjunction with 40 MHz OFDMA operation, for the 242 tones, three tones near the center and three tones near DC may not be usable. Moreover, for the 106 tones, seven tones may not be usable. Note that the identified tones are examples and the location of the nulling may depend on the resource-unit location.

Consequently, the new tone mapping for a 20 MHz electronic device used in 40 MHz OFDMA operation may depend on the resource-unit location. As an illustrative but not limiting example, for the 242 tones, nine data tones may be nullified (so that the remaining tones are aligned with those used in 40 MHz OFDMA operation), including three data tones near DC, three data tones near center, and an additional three data tones near the edge. In particular, subcarriers [−129:−127, −8:−3] for the lower band may be nullified, or subcarriers [3:8, 127:129] for the upper band may be nullified. Moreover, the number of data tones may be reduced from 234 to 225 (and the data rate may be reduced by 4%). As another illustrative but not limiting example, for the 106 tones, six data tones and one pilot tone may be nullified at an edge. In particular, subcarrier [−144:−138] for the lowest band may be nullified, subcarriers [−109:−107, −6:−4] for the second band may be nullified, subcarriers [4:6, 107:109] for the third band may be nullified, or subcarriers [138:144] for the highest band may be nullified. Furthermore, the number of data tone may be reduced from 102 to 96 (and the data rate may be reduced by 6%), and the number of pilot tones may be reduced from four to three (e.g., the outer 106 tones may have three pilot tones). Note that the pilot tones may be re-indexed from the perspective of the receiving electronic device.

In addition, the interleaving parameters used in OFDMA may be modified for 40 MHz operation. This is shown in Table 1, which provides an illustrative but not limiting example of interleaving parameters used in the communication technique during communication between electronic devices, such as the electronic devices of FIG. 1. In particular, the interleaving parameters that are used to assign bits to tones may need to be modified so that the code bits match the number of tones during the transformation from the bit domain to the tone domain. (In this way, a bit at position I in a bit stream at the transmitting electronic device will be at position J in the recovered bit stream at the receiving electronic device.) In Table 1, note that $N_{BPSK}$ is the number of bits based on the phase-shift keying or coding technique used (for example, with binary phase-shift keying $N_{BPSK}$ may be one, with quadrature phase-shift keying $N_{BPSK}$ may be two, with 16-quadrature amplitude modulation $N_{BPSK}$ may be four, with 256-quadrature amplitude modulation $N_{BPSK}$ may be eight, etc.). Thus, with binary phase-shift keying and 20 MHz operation there may be 6.16 or 96 tones for the 106-tone resource units.

TABLE 1

| | | | 106 Tone | | 242 Tone | |
|---|---|---|---|---|---|---|
| Parameter | 26 Tone | 52 Tone | 20 MHz | Otherwise | 20 MHz | Otherwise |
| Ncol | 8 | 16 | 16 | 17 | 25 | 26 |
| Nrow | $3 \cdot N_{BPSK}$ | $3 \cdot N_{BPSK}$ | $6 \cdot N_{BPSK}$ | | $9 \cdot N_{BPSK}$ | |
| Nrot (Nss ≤ 4) | 2 | 11 | 29 | | 58 | |

By using the communication technique, operation with 242-tone resource units and 106-tone resource units may be scalable for 20 MHz electronic devices in 40 MHz OFDMA operation. In particular, the remaining tones used in the resource units for the different bandwidths may be aligned so that the different resource units and bandwidths are compatible with each other.

Similarly, in another illustrative but not limiting example, when a 20 MHz electronic device is used in 80 MHz OFDMA, for 242 tones, 18 data tones (including three data tones near DC, six data tones at the left edge and five data tones at the right edge) may be nullified. In particular, subcarriers [−500:−492, −385:−383, −261:−259] and [−258:−249−129:−127−19:−17] may be nullified for the two lower bands, or subcarriers [17:19, 127:129, 249:258] and [259:261, 383:385, 492:500] may be nullified for the two upper bands. Consequently, the number of data tones may be reduced from 234 to 216 (and the data rate may be reduced by 8%) and the number of pilot tones may be reduced from eight to seven. Moreover, in yet another illustrative but not limiting example, for the 106 tones, four to twelve data tones may not be usable. For example, twelve data tones may be nullified so the number of data tones is reduced from 102 to 90 (and the data rate may be reduced by 12%), and the number of pilot tones may be reduced from four to three. In particular, subcarriers [−499:−496, −400:−394], [−271:−260], [−257:−251, −156:−152], [−123:−112, −18], [18, 112: 123], [152:156, 251:257] and [260:271] may be nullified, or subcarriers [394:400, 496:499] may be nullified. Note that the exact location of the nulling may depend on the resource-unit location, and the pilot tones may be re-indexed from the perspective of the receiving electronic device.

In addition, the interleaving parameters used in OFDMA may be modified for 80 MHz operation. This is shown in Table 2, which provides an illustrative but not limiting example of interleaving parameters used in the communication technique during communication between electronic devices, such as the electronic devices of FIG. 1.

TABLE 2

| Parameter | 26 Tone | 52 Tone | 106 Tone 20 MHz | 106 Tone Otherwise | 242 Tone 20 MHz | 242 Tone Otherwise |
|---|---|---|---|---|---|---|
| Ncol | 8 | 16 | 15 | 17 | 24 | 26 |
| Nrow | $3 \cdot N_{BPSK}$ | $3 \cdot N_{BPSK}$ | $6 \cdot N_{BPSK}$ | | $9 \cdot N_{BPSK}$ | |
| Nrot (Nss ≤ 4) | 2 | 11 | 29 | | 58 | |

Thus, using the communication technique operation with 242-tone resource units and 106-tone resource units may be scalable for 20 MHz electronic devices in 80 MHz OFDMA operation.

Table 3 provides an example of information in the header that is used to convey tones and resource block subchannels used in the communication technique during communication between electronic devices, such as the electronic devices of FIG. 1. In particular, HE SIG-B may have a common field with, e.g., eight bits, that indicates the resource-unit mapping. As shown in Table 3, prefixes '0001', '011' and '111' may be used to specify tone and resource block subchannel configurations in the communication technique. For example, for prefix '0001' there may be 16 configurations (specified by binary values xxxx for [0:15]), and prefixes '011' and '111' may each have 32 configurations (specified by binary values xxxxx for [0:31]). Note that these modifications may only apply for the 106-tone and the 242-tone resource units. Moreover, In Table 3 binary values yyy for [0:7] may indicate the number of electronic devices or stations multiplexed in a resource unit.

TABLE 3

| | | | | | | | | |
|---|---|---|---|---|---|---|---|---|
| 0000 1100 | 52 | | 52 | 26 | 26 | 26 | 26 26 | 1 |
| 0000 1101 | 52 | | 52 | 26 | 26 | 26 | 52 | 1 |
| 0000 1110 | 52 | | 52 | 26 | 52 | | 26 26 | 1 |
| 0000 1111 | 52 | | 52 | 26 | 52 | | 52 | 1 |
| 0001 xxxx | | | | See Table 4 | | | | 16 |
| 00100 yyy | 26 | 26 | 26 | 26 | 26 | | 106 | 8 |
| 00101 yyy | 26 | 26 | | 52 | 26 | | 106 | 8 |
| 01100 yyy | | | 52 | 26 26 | 26 | | 106 | 8 |
| 00111 yyy | | | 52 | 52 | 26 | | 106 | 8 |
| 01000 yyy | | | 106 | | 26 | 26 | 26 26 | 8 |
| 01001 yyy | | | 106 | | 26 | 26 | 26 52 | 8 |
| 01010 yyy | | | 106 | | 26 | 52 | 26 26 | 8 |
| 01011 yyy | | | 106 | | 26 | 52 | 52 | 8 |
| 011 xxxxx | | | | See Table 4 | | | | 32 |
| 10 yyy yyy | | | 106 | | 26 | | 106 | 64 |
| 11000 yyy | | | | 242 | | | | 8 |
| 11001 yyy | | | | 484 | | | | 8 |
| 11010 yyy | | | | 996 | | | | 8 |
| 11011 yyy | | | | 2 · 996 | | | | 8 |
| 111 xxxxx | | | | See Table 4 | | | | 32 |

Table 4 provides an example of information in the header that is used to convey tones and resource block subchannels used in the communication technique during communication between electronic devices, such as the electronic devices of FIG. 1. In particular, Table 4 provides an example of a new resource-unit mapping in the communication technique for prefixes '0001', '011' and '111' in Table 3. In Table 4, binary values yy specify up to four users, and binary value yyyy specifies up to 32 users. Note that an additional 28 cases can be specified. Alternatively or additionally, the tones and resource block subchannels used in the communication technique may be signaled in user-specific field with, e.g., one new bit in HE SIG-B.

TABLE 4

| 8 bit indices | Resource-Unit Mapping | | | | | | | Number of Users |
|---|---|---|---|---|---|---|---|---|
| 011000yy | 26 | 26 | 26 | 26 | 26 | | 106 | 4 |
| 011001yy | 26 | 26 | | 52 | 26 | | 106 | 4 |
| 011010yy | | | 52 | 26 26 | 26 | | 106 | 4 |
| 011011yy | | | 52 | 52 | 26 | | 106 | 4 |
| 011100yy | | | 106 | | 26 | 26 26 26 | 4 | 4 |
| 011101yy | | | 106 | | 26 | 26 26 | 52 | 4 |
| 011110yy | | | 106 | | 26 | 52 | 26 26 | 4 |
| 01111yy | | | 106 | | 26 | 52 | 52 | 4 |
| 0001yyyy | | | 106 | | 26 | | 106 | 16 |
| 111000yy | | | | 242 | | | | 4 |

In some embodiments, such as for MU-MIMO, the same resource-unit tone mapping may be applied for users in a MU-MIMO group, with up to four simultaneous users. For example, one 106-tone resource unit may have eight configurations for up to four users, two 106-tone resource units may be used by up to four users in the first resource unit and up to four users in the second resource unit, and one 242-tone resource unit may be used by up to four users. Therefore, there may be 52 cases.

While the preceding examples are intended as illustrations of the communication technique, in other embodiments at least some different tone indices may be nullified and at least some tone indices that were nullified in the preceding examples may not be nullified. Moreover, the interleaving parameters may be changed depending on how many tones are nullified. Furthermore, the interleaving parameters shown in Table 2 may be used for 40 MHz OFDMA operation.

We now describe embodiments of an electronic device. FIG. 8 presents a block diagram of an electronic device 800 (which may be an access point or the other electronic device, such as a station) in accordance with some embodiments. This electronic device includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, programmable-logic devices, and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), a read-only memory (ROM), flash memory, and/or other types of memory. In some embodiments, instructions for processing subsystem 810 in memory subsystem 812 include: one or more program modules or sets of instructions (such as program module 822 or operating system 824), which may be executed by processing subsystem 810. For example, a ROM can store programs, utilities or processes to be executed in a non-volatile manner, and DRAM can provide volatile data storage, and may store instructions related to the operation of electronic device 800. Note that the one or more computer programs may constitute a computer-program mechanism or software. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810. In some embodiments, the one or more computer programs are distributed over a network-coupled computer system so that the one or more computer programs are stored and executed in a distributed manner.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and a set of antennas 820 (or antenna elements) in an adaptive array that can be selectively turned on and/or off by control logic 816 to create a variety of optional antenna patterns or 'beam patterns.' (While FIG. 8 includes set of antennas 820, in some embodiments electronic device 800 includes one or more nodes, such as nodes 808, e.g., a pad, which can be coupled to set of antennas 820. Thus, electronic device 800 may or may not include set of antennas 820.) For example, networking subsystem 814 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices.

Within electronic device 800, processing subsystem 810, memory subsystem 812, and networking subsystem 814 are coupled together using bus 828 that facilitates data transfer between these components. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc. Display subsystem 826 may be controlled by processing subsystem 810 to display information to a user (e.g., information relating to incoming, outgoing, or an active communication session).

Electronic device 800 can also include a user-input subsystem 830 that allows a user of the electronic device 800 to interact with electronic device 800. For example, user-input subsystem 830 can take a variety of forms, such as: a button, keypad, dial, touch screen, audio input interface, visual/image capture input interface, input in the form of sensor data, etc.

Electronic device 800 can be (or can be included in) any electronic device with at least one network interface. For example, electronic device 800 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program module 822 is included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 814. This integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., receiving a payload using a different set of tones than were used to transmit the payload, etc.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 822, operating system 824 (such as a driver for interface circuit 818) or in firmware in interface circuit 818. Alternatively or additionally, at least some of the operations in the communication technique may be implemented in a physical layer, such as hardware in interface circuit 818. In an exemplary embodiment, the communication technique is implemented, at least in part, in a MAC layer and/or in a physical layer in interface circuit 818.

Dynamic Channel Access Technique Using Non-Primary Channels

Next, a communication technique involving an electronic device that communicates a frame with an access point in a WLAN is described. The electronic device dynamically switches the channel access mode when communicating (i.e., transmitting or receiving) the frame with the access point depending on whether the communication includes a primary channel (such as a primary 20 MHz channel). In particular, during operation an interface circuit in the electronic device uses an access-point-based scheduled-access technique when transmitting or receiving, in a multi-user PLCP protocol data unit (or MU-PPDU), the frame via a non-primary channel (such as a non-primary 20 MHz channel) and without using the primary 20 MHz channel. Alternatively, the interface circuit may use a contention-based channel access technique when transmitting or receiving, in a single-user PPDU (or SU-PPDU), the frame via the primary 20 MHz channel, or may use the access-point-based scheduled-access technique when transmitting or receiving, in another MU-PPDU, the frame using the primary 20 MHz channel.

By allowing the channel access mode to be dynamically switched, this communication technique allows the electronic device to avoid using unnecessary bandwidth during the communication or the need to redundantly communicate data in multiple channels that is subsequently discarded. Consequently, the communication technique may provide flexibility in the channel configuration that avoids wasting valuable network resources and can reduce the power consumption of the electronic device. In addition, allowing the use of the non-primary 20 MHz channel, the communication technique eliminates a backwards compatibility constraint with other (existing) IEEE 802.11 standards, thereby allowing an electronic device that is unable to operate at a larger bandwidth that includes the primary channel to communicate with the access point. Therefore, the communication technique may improve the user experience when using the electronic device or the access point, and thus may increase customer satisfaction and retention.

As discussed previously, FIG. 1 presents a block diagram illustrating an example of electronic devices communicating wirelessly. In particular, at least one of electronic devices 110 (such as a smartphone, a laptop computer or a tablet) and access point 112 communicate wirelessly. These electronic devices may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual access point that is implemented on a computer.

As described with reference to FIG. 8, electronic devices 110 and access point 112 may include subsystems, such as a networking subsystem, a memory subsystem and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can comprise transmitting beacons on wireless channels to enable electronic devices to make initial contact with or to detect each other, followed by exchanging subsequent data/management frames (such as connect requests) to establish a connection (which is sometimes referred to as a 'Wi-Fi connection'), configure security options (e.g., IPSec), transmit and receive packets or frames via the connection, etc.

As shown in FIG. 1, wireless signals 116 (represented by a jagged line) are communicated by radios 114-1 and 114-2 in electronic device 110-1 and access point 112, respectively. For example, electronic device 110-1 and access point 112 may exchange packets using a Wi-Fi protocol in a wireless local area network (WLAN).

In particular, as described further below with reference to FIGS. 9 and 10, electronic device 110-1 may specify a channel access mode when communicating a frame with access point 112 depending on whether the communication includes a primary 20 MHz channel. In particular, radio 114-1 in electronic device 110-1 may use an access-point-based scheduled-access technique when transmitting or receiving, in a MU-PPDU, the frame via a non-primary 20 MHz channel and without using the primary 20 MHz channel. Alternatively, radio 114-1 may use a contention-based channel access technique (such as enhanced distributed channel access or EDCA) when transmitting or receiving, in a SU-PPDU, the frame via the primary 20 MHz channel, or may use the access-point-based scheduled-access technique when transmitting, in another MU-PPDU, the frame using the primary 20 MHz channel.

For example, as described further below, electronic device 110-1 may dynamically specify the access-point-based scheduled-access technique with the non-primary 20 MHz channel, the contention-based channel access technique with the primary 20 MHz channel or the access-point-based scheduled-access technique with the primary 20 MHz channel (which collectively are sometimes referred to as the 'channel access mode') using information included in: a high throughput (HT) control field in a data-frame header, a quality-of-service (QoS) control field in the data-frame header, or a frame-control field in the data-frame header. Alternatively, the information specifying the channel access mode may be included in a control frame or a management frame, such as in a header portion of the control frame or a header portion of the management frame. In some embodiments, the information specifying the channel access mode is direct (i.e., it may indicate the channel access mode used by electronic device 110-1). However, in other embodiments, the information specifying the channel access mode is indirect (i.e., it can be used to determine the channel access mode used by electronic device 110-1).

Note that, in the access-point-based scheduled-access technique, access point 112 may sense the primary 20 MHz channel or the non-primary 20 MHz channel to confirm that it is free before transmitting a frame in an MU-PPDU to electronic device 110-1. Alternatively, access point 112 may sense the primary 20 MHz channel or the non-primary 20 MHz channel to confirm that it is free before transmitting a trigger frame to electronic device 110-1, which allows electronic device 110-1 to transmit a frame in an MU-PPDU to access point 112. Moreover, in the contention-based channel access technique, electronic device 110-1 senses the primary 20 MHz channel to receive a frame in a SU-PPDU from access point 112, or to confirm that the primary 20 MHz channel is free prior to transmitting a frame in a SU-PPDU to access point 112.

In this way, electronic device 110-1 may communicate with access point 112 in a way that is not non-backwards compatible with other (existing) IEEE 802.11 standards in the access-point-based scheduled-access technique with the non-primary 20 MHz channel, but that is backwards compatible with the other IEEE 802.11 standards in the contention-based channel access technique with the primary 20 MHz channel or the access-point-based scheduled-access technique with the primary 20 MHz channel. Note that the ability to specify the channel access mode may allow electronic device 110-1 to statically define the channel access mode or to dynamically switch the channel access mode. For example, if electronic device 110-1 is only able to operate using 20 MHz bandwidth or prefers to operate using 20 MHz bandwidth (such as to reduce power consumption), electronic device 110-1 may be able to specify a corresponding channel access mode that allows electronic device 110-1 to communicate frames with access point 112.

Furthermore, when associating with access point 112, electronic device 110-1 may specify, in an information element in an association request, one or more of: whether electronic device 110-1 currently only operates using a bandwidth of 20 MHz, a preferred 20 MHz channel that the electronic device chooses to operate on and whether electronic device 110-1 can be assigned by access point 112 to a non-primary 20 MHz channel. In response, electronic device 110-1 may receive an association response from access point 112 that assigns electronic device 110-1 to the primary 20 MHz channel or a non-primary 20 MHz channel. Based on this assignment, electronic device 110-1 may communicate frames with access point 112 using a corresponding channel access mode.

After the association and the assignment, electronic device 110-1 or access point 112 may renegotiate (or redefine) the channel access mode using one of the techniques described previously (i.e., the data-frame header, the control frame or the management frame) to convey information that specifies one or more of: whether electronic device 110-1 currently only operates using a bandwidth of 20 MHz, a preferred 20 MHz channel that the electronic device chooses to operate on and whether electronic device 110-1 can be assigned by access point 112 to a non-primary 20 MHz channel. Note that the information may include a channel index and/or a resource unit of a particular 20 MHz channel to be used by electronic device 110-1, which may be the primary 20 MHz channel or the non-primary 20 MHz channel. Moreover, note that, when electronic device 110-1 is associating with access point 112, access point 112 may operate with a bandwidth of 20 MHz (which may allow association when electronic device 110-1 operates with a bandwidth of 20 MHz).

Additionally, when electronic device 110-1 uses the access-point-based scheduled-access technique with the non-primary 20 MHz channel or the access-point-based scheduled-access technique with the primary 20 MHz channel, access point 112 may group electronic device 110-1 with at least another electronic device (such as electronic device 110-2) that uses a different 20 MHz channel than electronic device 110-1 into the same or a common MU-PPDU. In particular, access point 112 may transmit and electronic device 110-1 may subsequently receive a trigger frame with scheduling information that groups electronic devices 110-1 and 110-2 into the same MU-PPDU. For example, the scheduling information may assign electronic devices 110-1 and 110-2 to different 20 MHz channels in the MU-PPDU, and the scheduling information may be redundantly communicated in the different 20 MHz channels. Alternatively, the trigger frame may include different scheduling information for electronic devices 110-1 and 110-2 in different 20 MHz channels (i.e., the scheduling information or content in different 20 MHz channels may be different).

Thus, this communication technique may allow electronic devices 110 and access point 112 to transmit and receive frames or packets using one or more channel access modes in a manner that is selectively compatible with other IEEE 802.11 standards, thereby providing additional degrees of freedom in allocating valuable network resources, managing power consumption and/or maximizing channel utilization or serving a QoS requirement of electronic devices 110. Consequently, the communication technique may facilitate communication compatibility of electronic devices 110 and access point 112 (such as when electronic device 110-1 is restricted to using a particular bandwidth, e.g., 20 MHz), may improve the efficiency of the use of network resources, may reduce power consumption and/or may improve communication performance. These capabilities may improve the performance of electronic devices 110 and access point 112, and thus may improve the user experience when using electronic devices 110 and access point 112.

In the described embodiments, processing a packet or frame in one of electronic devices 110 and/or access point 112 includes: receiving wireless signals 116 encoding the packet or frame; decoding/extracting the packet or frame from received wireless signals 116 to acquire the packet or frame; and processing the packet or frame to determine information contained in the packet or frame (such as data in a payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers or types of electronic devices may be present. For example, some embodiments comprise more or fewer electronic devices. As another example, in another embodiment, different electronic devices can be transmitting and/or receiving packets or frames.

Figure 9:
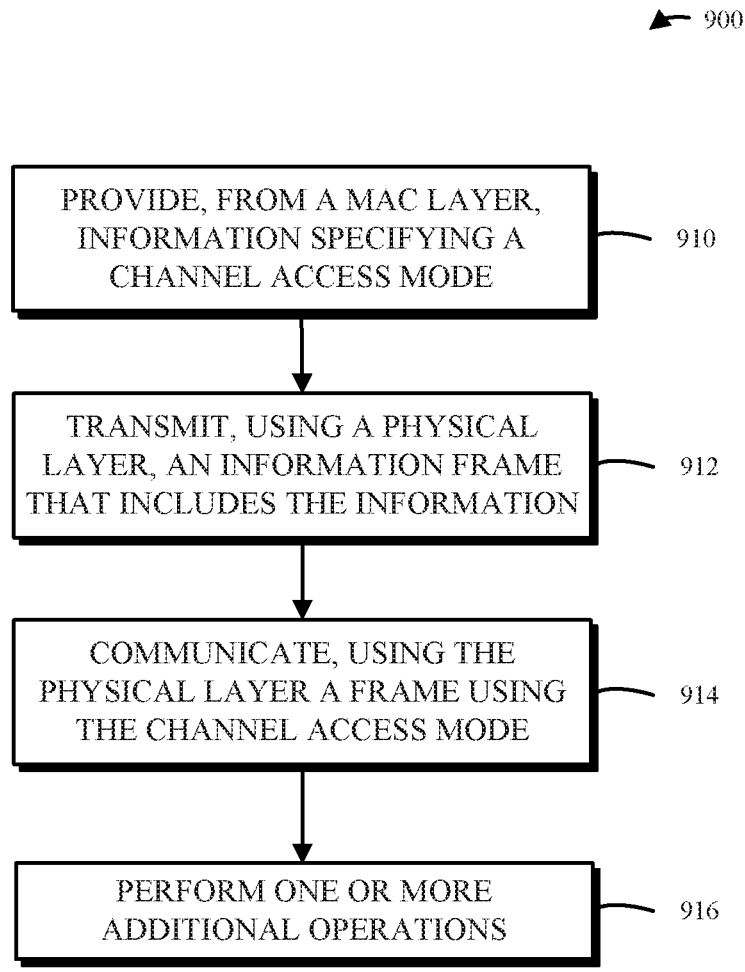
FIG. 9 is a flow diagram illustrating an example of a method for communicating a frame using one of the electronic devices in FIG. 1.

FIG. 9 presents a flow diagram illustrating an example method 900 for communicating a frame in accordance with some embodiments. This method may be performed by an electronic device, such as electronic device 110-1 in FIG. 1. During operation, a media access control (MAC) layer in an interface circuit in the electronic device provides information specifying a channel access mode (operation 910) to a physical layer in the interface circuit in the electronic device, where the channel access mode includes a scheduled-access technique when communicating (i.e., transmitting or receiving), in a MU-PPDU, the frame via a non-primary 20 MHz channel and without using the primary 20 MHz channel. Alternatively, the channel access mode includes a contention-based channel access technique when transmitting or receiving, in a SU-PPDU, the frame via the primary 20 MHz channel, or may include the scheduled-access technique when transmitting, in another MU-PPDU, the frame using the primary 20 MHz channel.

Then, the physical layer transmits an information frame with the information (operation 912) to an access point, where the information frame may include a data frame and the information may be included in a data-frame header, such as: a HT control field in the data-frame header, a QoS control field in the data-frame header, or a frame-control field in the data-frame header. Alternatively, the information frame may include a control frame or a management frame.

Next, the physical layer communicates the frame (operation 914) with the access point using the channel access mode.

In some embodiments, the electronic device optionally performs one or more additional operations (operation 916) before or after the aforementioned operations. For example, when associating with the access point, the electronic device may transmit an association request with an information element that specifies one or more of: whether the electronic device currently only operates using a bandwidth of 20 MHz, a preferred 20 MHz channel that the electronic device chooses to operate on and whether the electronic device can be assigned by the access point to a non-primary 20 MHz channel. In response, the electronic device may receive an association response from the access point that assigns the electronic device to the primary 20 MHz channel or a non-primary 20 MHz channel.

Subsequently, the electronic device may transmit another information frame to renegotiate the channel access mode by conveying information that specifies one or more of: whether the electronic device currently only operates using a bandwidth of 20 MHz, a preferred 20 MHz channel that the electronic device chooses to operate on and whether the electronic device can be assigned by the access point to a non-primary 20 MHz channel. Note that the information may include a channel index and/or a resource unit of a particular 20 MHz channel to be used by the electronic device, which may be the primary 20 MHz channel or the non-primary 20 MHz channel. Moreover, note that, when the electronic device is associating with the access point, the access point may operate with a bandwidth of 20 MHz (which may allow association when the electronic device operates with a bandwidth of 20 MHz).

Furthermore, when using the scheduled-access technique with the non-primary 20 MHz channel or the scheduled-access technique with the primary 20 MHz channel, the electronic device may receive a trigger frame from the access point with scheduling information that groups the electronic device with at least another electronic device that uses a different 20 MHz channel than the electronic device into the same MU-PPDU. For example, the scheduling information may assign the electronic device and at least the other electronic device to different 20 MHz channels in the MU-PPDU, and the scheduling information may be redundantly communicated in the different 20 MHz channels. Alternatively, the trigger frame may include different scheduling information for the electronic device and at least the other electronic device in different 20 MHz channels.

Figure 10:
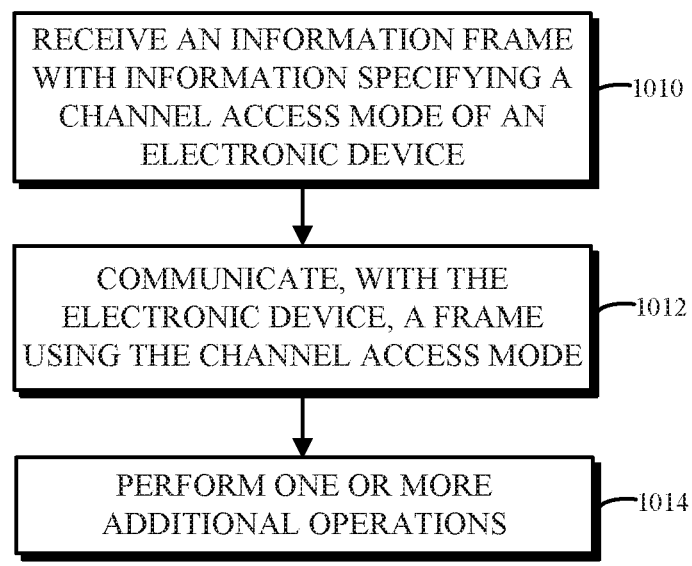
FIG. 10 is a flow diagram illustrating an example of a method for communicating a frame using one of the electronic devices in FIG. 1.

FIG. 10 presents a flow diagram illustrating an example method 1000 for communicating a frame in accordance with some embodiments. This method may be performed by an access point, such as access point 112 in FIG. 1. During operation, an interface circuit in the access point receives the information frame (operation 1010) with the information specifying the channel access mode of the electronic device. Then, the access point communicates the frame (operation 1012) with the electronic device using the channel access mode.

In some embodiments, the access point optionally performs one or more additional operations (operation 1014) before or after the aforementioned operations. For example, when associating with the electronic device, the access point may receive the association request with the information element. In response, the access point may transmit the association response to the electronic device that assigns the electronic device to the primary 20 MHz channel or the non-primary 20 MHz channel.

Subsequently, the access point may transmit another information frame to renegotiate the channel access mode by conveying information that specifies one or more of: whether the electronic device currently only operates using a bandwidth of 20 MHz, a preferred 20 MHz channel that the electronic device chooses to operate on and whether the electronic device can be assigned by the access point to a non-primary 20 MHz channel. Note that the information may include the channel index and/or the resource unit of the particular 20 MHz channel to be used by the electronic device, which may be the primary 20 MHz channel or the non-primary 20 MHz channel. Moreover, note that, when the electronic device is associating with the access point, the access point may operate with a bandwidth of 20 MHz (which may allow association when the electronic device operates with a bandwidth of 20 MHz).

Furthermore, when the electronic device uses the scheduled-access technique with the non-primary 20 MHz channel or the scheduled-access technique with the primary 20 MHz channel, the access point may group the electronic device with at least another electronic device that uses the different 20 MHz channel than the electronic device into the same MU-PPDU. In particular, the access point may transmit the trigger frame to the electronic device with the scheduling information. The scheduling information may assign the electronic device and at least the other electronic device to different 20 MHz channels in the MU-PPDU, and the scheduling information may be redundantly communicated in the different 20 MHz channels. Alternatively, the trigger frame may include different scheduling information for the electronic device and at least the other electronic device in different 20 MHz channels.

In this way, the electronic device and the access point may be non-backwards compatible with other (existing) IEEE 802.11 standards in the scheduled-access technique with the non-primary 20 MHz channel, but may be backwards compatible with the other IEEE 802.11 standards in the contention-based channel access technique with the primary 20 MHz channel or the scheduled-access technique with the primary 20 MHz channel. Thus, the wireless communication in method 900 (FIG. 9) or in method 1000 (FIG. 10) may involve an IEEE 802.11 communication protocol or a communication protocol that is selectively compatible with an IEEE 802.11 communication protocol.

In some embodiments of method 900 (FIG. 9) or of method 1000 (FIG. 10), there may be additional or fewer operations. For example, in some embodiments the electronic device may try to decode a frame or a packet on a non-primary channel. If a valid frame or packet is decoded, the electronic device may consider this non-primary channel to be busy for the time interval or duration indicated in the frame or packet. Moreover, the order of the operations may be changed, and/or two or more operations may be combined into a single operation.

In an exemplary embodiment, at least some of the operations in methods 900 (FIG. 9) and/or 1000 (FIG. 10) are performed by interface circuits in the electronic device and/or the access point. For example, at least some of the operations may be performed by firmware executed by an interface circuit, such as firmware associated with a MAC layer, as well as one or more circuits in a physical layer in the interface circuit.

Figure 11:
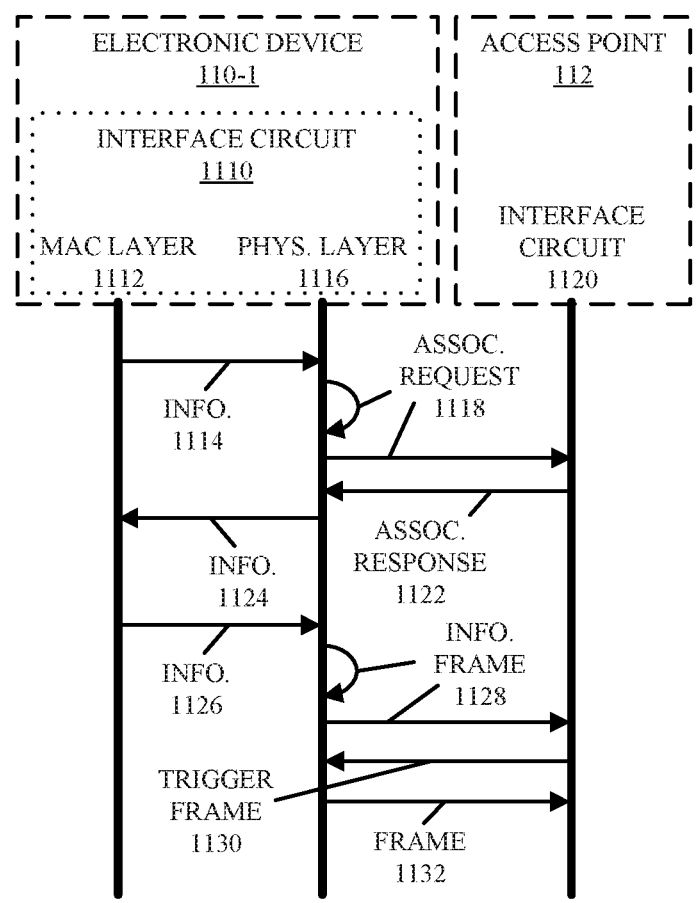
FIG. 11 is a flow diagram illustrating an example of communication between electronic devices, such as the electronic devices of FIG. 1.

The communication technique is further illustrated in FIG. 11, which presents a flow diagram illustrating an example of communication between electronic device 110-1 and access point 112. In particular, when associating with access point 112, a MAC layer 1112 in interface circuit 1110 in electronic device 110-1 may communicate information 1114 specifying a channel access mode to a physical layer 1116 in interface circuit 1112. Then, after assembling association request 1118, physical layer 1116 may transmit an association request 1118 with information 1114 to access point 112. For example, information 1114 may be included in an information element in association request 1118 that specifies one or more of: whether the electronic device currently only operates using a bandwidth of 20 MHz, a preferred 20 MHz channel that the electronic device chooses to operate on and whether the electronic device can be assigned by the access point to a non-primary 20 MHz channel. After receiving association request 1118, interface circuit 1120 in access point 112 may transmit an association response 1122 from the access point 112 that includes information 1124 that assigns the electronic device 110-1 to the primary 20 MHz channel or to a non-primary 20 MHz channel.

Subsequently, electronic device 110-1 or access point 112 may renegotiate the selected or specified channel access mode. This renegotiation may involve bidirectional communication (such as a request/response between access point 112 and electronic device 110-1) or may involve unidirectional communication (such as an indication/command without a response). For example, MAC layer 1112 may communicate information 1126 specifying the channel access mode to physical layer 1116. Then, after assembling frame 1128, physical layer 1116 may transmit an information frame 1128 with information 1126 to access point 112. Next, physical layer 1116 communicates frame 1130 with access point 112 using the specified channel access mode. For example, physical layer 1116 may transmit frame 1132 to access point 112.

In embodiments where the specified or selected channel access mode includes a scheduled-access technique, interface circuit 1120 provides a trigger frame 1130 to electronic device 110-1 before physical layer 1116 transmits frame 1132. When electronic device 110-1 uses the access-point-based scheduled-access technique with the non-primary 20 MHz channel or the access-point-based scheduled-access technique with the primary 20 MHz channel, trigger frame 1130 may group electronic device 110-1 with at least another electronic device that uses the different 20 MHz channel than electronic device 110-1 into the same MU-PPDU. As noted previously, trigger frame 1130 may include the scheduling information. This scheduling information may be redundantly communicated in the different 20 MHz channels or different scheduling information for electronic device 110-1 and at least the other electronic device may be included in different 20 MHz channels.

In these ways, electronic device 110-1 and access point 112 may communicate with each other using different channel access modes in the WLAN.

In an exemplary embodiment, the communication technique is used with an IEEE 802.11 ax communication protocol. This communication technique may allow electronic devices to selectively communicate with a bandwidth of 20 MHz or to only communicate with a bandwidth of 20 MHz (either of which is sometimes referred to as a '20 MHz electronic device'). In principle, enabling of 20 MHz electronic devices can allow some lower power electronic devices to operate in IEEE 802.11ax networks and to improve their throughput while saving more power.

However, a 20 MHz electronic device may be non-compliant to IEEE 802.11ac. In addition, the 20 MHz electronic device may operate on a different secondary or non-primary 20 MHz channel, i.e., these electronic devices may not sense the primary 20 MHz channel and their transmissions may not include the primary 20 MHz channel. Such operation has not been previously allowed in an IEEE 802.11 standard. Indeed, backward compatibility and operation on the primary channel have been the fundamental assumptions in prior IEEE 802.11 communication protocols.

Thus, the use of 20 MHz electronic devices raises MAC protocol issues. These issues are addressed in the communication technique using a MAC framework. In the discussion that follows, 80 MHz basic service set (BSS) operation is used as an illustrative example.

In particular, when an electronic device operates on a non-primary 20 MHz channel, it cannot sense or hear packets sent on the primary channel. As a result, the electronic device may not know if the medium is busy or not when another electronic device is using the entire channel (i.e., the other electronic device may be transmitting an 80 MHz PPDU and the electronic device cannot decode it and cannot set its network allocation vector). As a consequence, the electronic device may not participate in the EDCA contention process because that will ruin its own transmission as well as some ongoing transmissions.

To address this issue, the communication technique may allow a different channel access mode for the electronic device and may allow dynamic switching of the channel access mode. In particular, during a so-called 'multi-user-only mode', when the electronic device is operating on a non-primary 20 MHz channel, the electronic device may only use IEEE 802.11ax multi-user transmission to deliver frames and packets to an access point and for receiving frames and packets from the access point. Note that, by using the multi-user-only mode, the electronic device may not break legacy device transmission and may not get interference from legacy devices because the access point may perform sensing before downlink and uplink transmission (i.e., a schedule-based technique may be used for channel access). As described further below, in order to enable the multi-user-only mode, information specifying the channel access mode may need to be communicated between the electronic device and the access point.

Alternatively, during a so-called 'EDCA+multi-user mode', the electronic device may operate on the primary 20 MHz channel. In particular, the electronic device may communicate frames and packets with the access point using either EDCA (i.e., a contention-based channel access technique) or may transmit frames or packets to the access point using the multi-user mode (i.e., a schedule-based technique may be used for channel access).

As noted previously, the communication technique may include: dynamic switching of the channel access mode, specification of the channel access mode during association of the electronic device with the access point, and/or the access point transmitting a trigger frame that includes scheduling information that groups the electronic device with at least the other electronic device.

The dynamic mode switching can be performed in a variety of ways. In some embodiments, a mode-switching indication (i.e., changing the channel access mode) is carried or conveyed in a data-frame header. In particular, using an IEEE 801.11ax high efficiency (HE) variant of the HT control field (which is sometimes referred to as 'RE control'), there is information in the HE control to indicate a receive operation-mode indication. This receive operation-mode indication may be used to indicate or specify the maximum receive bandwidth and/or spatial streams. Moreover, the HE control may include: downlink or uplink (i.e., whether the mode change is applied to downlink, uplink, or both); and a mode indication or the switching mode that the electronic device will be using (e.g., multi-user on a non-primary 20 MHz channel, single-user on the primary 20 MHz channel, or single-user+multi-user on the primary 20 MHz channel). Alternatively, the mode-switching indication may be carried or conveyed using a QoS control header. For example, the queue-size field in the QoS control header currently uses the value 255 to indicate that the queue size is unspecified. The queue-size field may redefine this value to mean that, when queue size is set to 255, it indicates a mode change (i.e., changing the channel access mode). Furthermore, in some embodiments the mode change is indicated using the frame-control field. Currently, some fields in the frame-control field are not used or some value in some field inside the frame-control field is not used, and these unused fields or values may be used to indicate a mode change or mode switching. For example, the 'more data subfield' in the frame-control field may only have meaning in downlink. This bit can be redefined in uplink data to indicate the mode change.

Figure 12:
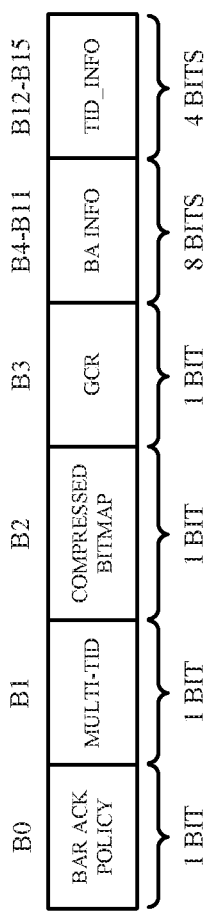
FIG. 12 is a drawing of an example of a control frame during communication between electronic devices, such as the electronic devices of FIG. 1.

In some embodiments, the mode-switching indication is carried or conveyed in a control frame. This is shown in FIG. 12, which presents a drawing of an example of a control frame 1200 during communication between electronic devices, such as the electronic devices of FIG. 1. In particular, the mode change may be carried in the block acknowledgment request (block ACK request) or block ACK frames. These frames carry a field called 'BA info' and the reserved bits b4-b11 can be used to indicate the mode change.

Alternatively, in some embodiments the mode-switching indication is carried or conveyed in a management frame. For example, a new information element called a '20 MHz mode change information element' may be defined. Note that an information element concept in IEEE 802.11 has a template format. The new information element may include information that specifies: the 20 MHz channel the electronic device will operate on; the operation mode for the electronic device to operate on; and/or whether the operation mode applies to downlink or uplink. Note that the information element may be carried or conveyed in association frames or in new IEEE 802.11ax management frames.

Another MAC protocol issue is that, in legacy operation, the access point always starts with transmission on the primary channel, which is guaranteed to be decoded by the electronic device. However, if the electronic device is operating on a non-primary channel, the access point may not know which 20 MHz channel the electronic device stays on, and thus the access point may not know where to send the frame or packet. In order to address this issue, the electronic device and the access point may negotiate which 20 MHz channel the electronic device stays on.

The negotiation of which 20 MHz channel to use may occur during association. In particular, after the electronic device indicates that it is a 20 MHz-only electronic device or currently uses a 20 MHz bandwidth in an association request, the access point may assign a primary or a non-primary 20 MHz channel for the electronic device to use and may reply in association response. In order to do this, a 20 MHz-operation information element may be defined. This information element may include information specifying one or more of: a 20 MHz indication (which may be set to '1' if the electronic device is 20 MHz, and '0' otherwise); a preferred 20 MHz channel that the electronic device chooses to operate on and whether the electronic device can be assigned to a non-primary 20 MHz channel.

After the association, the electronic device or the access point can re-negotiate the 20 MHz channel to use. The negotiation can be initiated by the access point, the electronic device, or both. Moreover, the negotiation can be performed in a request/response manner or by using an indication/command without the need for a response frame. Similar to the dynamic mode switching indication, the negotiation can be performed by exchanging or communicating information using: a data-frame header (such as the HE control header, an unused value in a QoS control header, and/or unused values in a frame-control field), a control frame, and/or a management frame. The information communicated during the negotiation may include one or more of: a 20 MHz indication (which may be set to '1' if the electronic device is 20 MHz, and '0' otherwise); a preferred 20 MHz channel that the electronic device chooses to operate on and whether the electronic device can be assigned to a non-primary 20 MHz channel.

Note that the representation of a particular 20 MHz channel in the signaling frames during the negotiation may include a channel index (e.g., 1, 2, 3, 4, for an 80 MHz channel) or a representation of a resource unit in IEEE 802.11ax orthogonal frequency division multiple access (OFDMA) operation.

In some embodiments, during the communication technique electronic devices in different 20 MHz channels can be scheduled into the same MU-PPDU in downlink or uplink. In particular, the access point can group electronic devices into different 20 MHz channels to maximize the channel utilization as well as serving QoS requirement for the electronic device(s). Note that the grouping criteria can be based on: an interference report from an electronic device on a particular 20 MHz channel; and/or a buffer status report from an electronic device regarding its buffer status.

However, this capability also raises MAC protocol issues. In particular, for uplink transmission, in order to schedule the electronic devices into the same uplink MU-PPDU, a trigger frame has to be sent out by the access point with scheduling information. Currently, the trigger frame is duplicated on different 20 MHz channels, i.e., the content in different 20 MHz channels is the same. However, in the communication technique with 20M Hz electronic devices, these electronic devices can only decode their own 20 MHz channel and, thus, the trigger frame sent on each 20 MHz channel can be different (i.e., tailored toward a particular electronic device in that 20 MHz channel).

A variety of trigger frame configurations may be used to implement this capability. In some embodiments, an existing trigger frame design may be used. In particular, a trigger frame may contain allocation information for four resource units, with only one electronic device scheduled to transmit on each 20 MHz channel in the response uplink MU-PPDU. In these embodiments, the trigger frame may still be duplicated on each 20 MHz channel. While this approach does not create a new physical-layer transmission mode, its signaling is redundant because it contains scheduling information for all 20 MHz channels.

Alternatively, a new trigger-frame transmission mode may be defined. In this mode, each trigger frame on each 20 MHz channel may contain different content that is destined to or intended for a different electronic device. In these embodiments, the trigger-frame design may be optimized.

Figure 13:
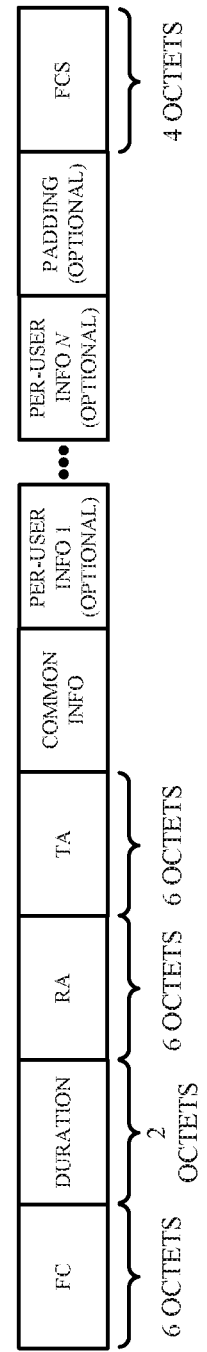
FIG. 13 is a drawing of an example of a trigger frame during communication between electronic devices, such as the electronic devices of FIG. 1.

FIG. 13 presents a drawing illustrating a trigger frame 1300 during communication between electronic devices, such as the electronic devices of FIG. 1. In particular, the 'per-user info list' may not be needed and may be removed completely. Note that this field contains resource-unit allocation, service-set allocation, etc. Moreover, the modulation coding scheme (MCS), coding type, and dynamic case management indication that were in the per-user field may be added to the 'common info field'. Furthermore, the padding may be removed because the 20 MHz-channel transmission is an SU-PPDU and may not need the padding time for extra processing time. The octets associated with the per-user info list and/or the padding may be used to provide the trigger information for the electronic device and the other electronic device in the different 20 MHz channels.

In summary, the communication technique may include a few fundamental MAC protocol elements to enable 20 MHz electronic devices to operate in IEEE 802.11ax networks. These MAC protocol elements may allow an electronic device to operate in any 20 MHz channel and this electronic device may be multiplexed with other wideband IEEE 802.11ax devices in the same PPDU. Moreover, an indication of the operation mode (which is sometimes referred to as the 'channel access mode') may be provided by the electronic device. Furthermore, the 20 MHz channel(s) to use may be negotiated by the access point and the electronic device. Furthermore, a new transmission mode of a trigger frame is proposed. The format and content design for the trigger frame may be optimized for such operation.

Representative Embodiments

In some embodiments, an electronic device includes an antenna and an interface circuit, coupled to the antenna, which, during operation, communicates with an access point. During operation, the interface circuit: (i) receives, from the access point, a header for a frame, the header including information specifying a first set of tones in an Orthogonal Frequency Division Multiple Access (OFDMA) communication, the first set of tones being associated with first resource block subchannels having a first bandwidth used by the access point to transmit a payload in the frame; (ii) obtains a second set of tones that are associated with second resource block having a second bandwidth that differs from the first bandwidth; and (iii) receives the payload in the frame using the OFDMA communication, the second resource block subchannels, and the second set of tones.

In some embodiments, the second bandwidth is less than the first bandwidth. In some embodiments, the second bandwidth is 20 MHz. In some embodiments, the second set of tones excludes one or more tones in the first set of tones so that the second resource block subchannels are compatible, e.g., aligned, with the first resource block subchannels. In some embodiments, receiving the payload involves selecting a number of columns used in data-tone interleaving based at least in part on the second resource block subchannels and the second set of tones. In some embodiments, the header includes a media access control (MAC) header and the information is included in an HE-SIG-B field. In some embodiments, the interface circuit, during operation, further: (i) assembles a second frame with a second header, the second header including information specifying the second resource block subchannels and the second set of tones; and (ii) transmits the second frame using the OFDMA communication, the second resource block subchannels, and the second set of tones. In some embodiments, the second frame is assembled and transmitted by a physical layer in the interface circuit, where, during operation and prior to assembling the second frame, the physical layer receives the information from a MAC layer in the interface circuit. In some embodiments, the second set of tones is used by a Multi-User Multiple Input Multiple Output (MU-MIMO) group of electronic devices that includes the electronic device. In some embodiments, the wireless communication involves an IEEE 802.11 communication protocol.

In some embodiments, a method for receiving a payload in a frame by an electronic device includes: (i) receiving from an access point, via an interface circuit of the electronic device, a header for the frame, the header including information specifying a first set of tones in Orthogonal Frequency Division Multiple Access (OFDMA) communication, the first set of tones being associated with first resource block subchannels having a first bandwidth used by the access point to transmit the payload in the frame; (ii) obtaining a second set of tones that are associated with second resource block subchannels having a second bandwidth that differs from the first bandwidth; and (iii) receiving the payload in the frame using the OFDMA communication, the second resource block subchannels, and the second set of tones.

In some embodiments, an access point includes an antenna, and an interface circuit, coupled to the antenna, which, during operation, communicates with an electronic device. During operation, the interface circuit: (i) receives, from an electronic device, a header for a frame, the header including information specifying a second set of tones in Orthogonal Frequency Division Multiple Access (OFDMA) communication, the second set of tones being associated with second resource block subchannels having a second bandwidth used by the electronic device to transmit a payload in the frame; (ii) obtains a first set of tones that are associated with first resource block subchannels having a first bandwidth that differs from the second bandwidth; and (iii) receives the payload in the frame using the OFDMA communication, the first resource block subchannels, and the first set of tones.

In some embodiments, the second bandwidth is less than the first bandwidth. In some embodiments, the second bandwidth is 20 MHz. In some embodiments, the second set of tones excludes some tones in the first set of tones so that the second resource block subchannels are compatible with the first resource block subchannels. In some embodiments, receiving the payload involves selecting a number of columns used in data-tone interleaving based on the first resource block subchannels and the first set of tones. In some embodiments, the header includes a media access control (MAC) header and the information is included in an HE-SIG-B field. In some embodiments, during operation, the interface circuit: (i) assembles a second frame with a second header, the second header including information specifying the first resource block subchannels and the first set of tones; and (ii) transmits the second frame using the OFDMA communication, the first resource block subchannels, and the first set of tones. In some embodiments, the second frame is assembled and transmitted by a physical layer in the interface circuit, and during operation and prior to assembling the second frame, the physical layer receives the information from a MAC layer in the interface circuit. In some embodiments, the second set of tones are used by a Multi-User Multiple Input Multiple Output (MU-MIMO) group of electronic devices that includes the electronic device. In some embodiments, the wireless communication involves an IEEE 802.11 communication protocol.

In some embodiments, a method for receiving a payload in a frame by an access point includes: (i) receiving, via an interface circuit of the access point, from an electronic device, a header for the frame, the header including information specifying a second set of tones in an Orthogonal Frequency Division Multiple Access (OFDMA) communication, the second set of tones being associated with second resource block subchannels having a second bandwidth used by the electronic device to transmit the payload in the frame; (ii) obtaining a first set of tones that are associated with first resource block subchannels having a first bandwidth that differs from the second bandwidth; and (iii) receiving the payload in the frame using the OFDMA communication, the first resource block subchannels, and the first set of tones.

In some embodiments, an electronic device includes an antenna; and an interface circuit, coupled to the antenna, which, during operation, communicates with an access point. During operation, a media access control (MAC) layer in the interface circuit provides information specifying a channel access mode of the electronic device to a physical layer in the interface circuit, where the channel access mode includes one of: (i) a scheduled-access technique when communicating, in a multi-user (MU) physical layer convergence protocol (PLCP) protocol data unit (MU-PPDU), a frame via a non-primary channel and without using a primary channel; (ii) a contention-based channel access technique when communicating, in a single-user PPDU (SU-PPDU), the frame via the primary channel; and (iii) the scheduled-access technique when communicating, in another MU-PPDU, the frame using the primary channel. Further, during operation, the physical layer transmits an information frame with the information to the access point.

In some embodiments, the information frame includes at least one of: a data frame, a control frame, or a management frame. In some embodiments, the information is included in at least one of: a high-throughput (HT) control field in a data-frame header, a quality-of-service (QoS) control field in the data-frame header, or a frame-control field in the data-frame header. In some embodiments, during operation and prior to the MAC layer providing the information and the physical layer transmitting the information frame, the physical layer: (i) transmits, to the access point, an association request with an information element that specifies at least one of: whether the electronic device currently only operates using a bandwidth of 20 MHz, a preferred 20 MHz channel that the electronic device chooses to operate on, and whether the electronic device can be assigned by the access point to the non-primary channel; and (ii) receives, from the access point, an association response that assigns the electronic device to one of the primary channel or the non-primary channel. In some embodiments, during operation, the physical layer transmits another information frame to renegotiate the channel access mode, where the other information frame includes additional information that specifies at least one of: whether the electronic device currently only operates using a bandwidth of 20 MHz, a preferred 20 MHz channel that the electronic device chooses to operate on, or whether the electronic device can be assigned by the access point to the non-primary channel. In some embodiments, the additional information includes one of: a channel index, a resource unit, or both the channel index and the resource unit of a channel to be used by the electronic device. In some embodiments, the channel is the primary channel. In some embodiments, the channel is the non-primary channel. In some embodiments, during operation, the physical layer communicates the frame with the access point using the channel access mode. In some embodiments, when using one of the scheduled-access technique with the non-primary channel and the scheduled-access technique with the primary channel, the physical layer receives a trigger frame from the access point with scheduling information that groups the electronic device into a common MU-PPDU with at least another electronic device that uses a different channel than the electronic device. In some embodiments, the scheduling information assigns the electronic device and at least the other electronic device to different channels in the common MU-PPDU, where the scheduling information is redundantly communicated in the different channels. In some embodiments, the scheduling information assigns the electronic device and at least the other electronic device to different channels in the common MU-PPDU, where the trigger frame includes different scheduling information for the electronic device and at least the other electronic device in different channels. In some embodiments, communicating the frame and the information frame involves an IEEE 802.11ax communication protocol. In some embodiments, when using the scheduled-access technique with the non-primary channel, the electronic device is non-backwards compatible with other IEEE 802.11 communication protocols, and when using one of the channel access technique with the primary channel and the scheduled-access technique with the primary channel, the electronic device is backwards compatible with the other IEEE 802.11 communication protocols.

In some embodiments, a method for communicating a frame by an electronic device includes: (i) using a media access control (MAC) layer in an interface circuit of the electronic device, providing information specifying a channel access mode of the electronic device to a physical layer in the interface circuit, where the channel access mode includes one of: a scheduled-access technique when communicating, in a multi-user (MU) physical layer convergence protocol (PLCP) protocol data unit (MU-PPDU), a frame via a non-primary channel and without using a primary channel, a contention-based channel access technique when communicating, in a single-user PPDU (SU-PPDU), the frame via the primary channel, or the scheduled-access technique when communicating, in another MU-PPDU, the frame using the primary channel; and (ii) using the physical layer, transmitting an information frame with the information to the access point.

In some embodiments, an access point includes an antenna and an interface circuit coupled to the antenna, which, during operation, communicates with an electronic device. During operation, the interface circuit: (i) receives, from the electronic device, an information frame that includes information specifying a channel access mode of the electronic device, where the channel access mode includes one of: a scheduled-access technique when communicating, in a multi-user (MU) physical layer convergence protocol (PLCP) protocol data unit (MU-PPDU), a frame via a non-primary channel and without using a primary channel; a contention-based channel access technique when communicating, in a single-user PPDU (SU-PPDU), the frame via the primary channel; or the scheduled-access technique when communicating, in another MU-PPDU, the frame using the primary channel; and (ii) communicates the frame with the electronic device using the channel access mode.

In some embodiments, the information frame includes one of: a data frame, a control frame or a management frame. In some embodiments, the information is included in a portion of frame header of the information frame, e.g., in one of: a high-throughput (HT) control field of a frame header of the information frame, a quality-of-service (QoS) control field in the frame header of the information frame, or a frame-control field in the frame header of the information frame. In some embodiments, during operation and prior receiving the information frame and communicating the frame, the interface circuit: (i) receives, from the electronic device, an association request with an information element that specifies at least one of: whether the electronic device currently only operates using a bandwidth of 20 MHz, a preferred 20 MHz channel that the electronic device chooses to operate on, or whether the electronic device can be assigned by the access point to the non-primary channel; and (ii) transmits, to the electronic device, an association response that assigns the electronic device to one of the primary channel or the non-primary channel. In some embodiments, during operation, the interface circuit transmits another information frame to renegotiate the channel access mode, where the other information frame includes additional information that specifies at least one of: whether the electronic device currently only operates using a bandwidth of 20 MHz, a preferred 20 MHz channel that the electronic device chooses to operate on, or whether the electronic device can be assigned by the access point to the non-primary channel. In some embodiments, the additional information includes one of: a channel index, a resource unit, or both the channel index and the resource unit of a channel to be used by the electronic device, where the channel is the primary channel or the non-primary channel. In some embodiments, when the electronic device uses one of: the scheduled-access technique with the non-primary channel or the scheduled-access technique with the primary channel, the interface circuit transmits a trigger frame to the electronic device with scheduling information that groups the electronic device with at least another electronic device that uses a different channel than the electronic device into a common MU-PPDU. In some embodiments, the scheduling information assigns the electronic device and at least the other electronic device to different channels in the common MU-PPDU, where the scheduling information is redundantly communicated in the different channels. In some embodiments, the scheduling information assigns the electronic device and at least the other electronic device to different channels in the common MU-PPDU, where the trigger frame includes different scheduling information for the electronic device and at least the other electronic device in different channels. In some embodiments, receiving the information frame and communicating the frame involve an IEEE 802.11ax communication protocol. In some embodiments, when using the scheduled-access technique with the non-primary channel, the communication with the electronic device is non-backwards compatible with other IEEE 802.11 communication protocols; and when using one of the channel access technique with the primary channel and the scheduled-access technique with the primary channel, the communication with the electronic device is backwards compatible with the other IEEE 802.11 communication protocols. In some embodiments, the access point operates with a bandwidth of 20 MHz while the electronic device is associating with the access point.

In some embodiments, a method for communication a frame includes using an interface circuit of an access point to: (i) receive, from an electronic device, an information frame that includes information specifying a channel access mode of the electronic device, where the channel access mode includes one of: a scheduled-access technique when communicating, in a multi-user (MU) physical layer convergence protocol (PLCP) protocol data unit (MU-PPDU), a frame via a non-primary channel and without using a primary channel; a contention-based channel access technique when communicating, in a single-user PPDU (SU-PPDU), the frame via the primary channel; or the scheduled-access technique when communicating, in another MU-PPDU, the frame using the primary channel; and (ii) communicate the frame with the electronic device using the channel access mode.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna; and
an interface circuit, coupled to the antenna, and which, during operation, communicates with an access point; wherein, during operation:
a physical layer in the interface circuit:
transmits, to the access point, an association request with an information element that specifies:
i) whether the electronic device currently only operates using a bandwidth of 20 MHz,
ii) a preferred 20 MHz channel that the electronic device chooses to operate on, and
iii) whether the electronic device can be assigned by the access point to a non-primary channel; and
receives, from the access point, an association response that assigns the electronic device to a primary channel or the non-primary channel;
a media access control (MAC) layer in the interface circuit provides information specifying a channel access mode of the electronic device to the physical layer in the interface circuit, wherein the channel access mode indicates to the physical layer to transmit using:
a scheduled-access technique when communicating, in a multi-user (MU) physical layer convergence protocol (PLCP) protocol data unit (MU-PPDU), a frame via the non-primary channel and without using the primary channel;
a contention-based channel access technique when communicating, in a single-user PPDU (SU-PPDU), the frame via the primary channel; and
the scheduled-access technique when communicating, in another MU-PPDU, the frame using the primary channel; and
the physical layer transmits an information frame with the information specifying the channel access mode of the electronic device to the access point using a Quality of Service (QoS) queue-size field value reserved for an unspecified queue size.

2. The electronic device of claim 1, wherein, during operation, the physical layer transmits another information frame to renegotiate the channel access mode; and
wherein the another information frame includes additional information that specifies:
i) whether the electronic device currently only operates using a bandwidth of 20 MHz,
ii) a preferred 20 MHz channel that the electronic device chooses to operate on, and
iii) whether the electronic device can be assigned by the access point to the non-primary channel.

3. The electronic device of claim 2, wherein the additional information includes one of: a channel index, a resource unit, or both the channel index and the resource unit of a channel to be used by the electronic device.

4. The electronic device of claim 1, wherein, during operation, the physical layer communicates the frame with the access point using the channel access mode.

5. The electronic device of claim 4, wherein, when using one of the scheduled-access technique with the non-primary channel and the scheduled-access technique with the primary channel, the physical layer receives a trigger frame from the access point with scheduling information that groups the electronic device into a common MU-PPDU with at least another electronic device that uses a different channel than the electronic device.

6. The electronic device of claim 5, wherein the scheduling information assigns the electronic device and at least the another electronic device to different channels in the common MU-PPDU; and
wherein the scheduling information is redundantly communicated in the different channels.

7. The electronic device of claim 5, wherein the scheduling information assigns the electronic device and at least the another electronic device to different channels in the common MU-PPDU; and wherein the trigger frame includes different scheduling information for the electronic device and at least the another electronic device in different channels.

8. The electronic device of claim 1, wherein communicating the frame and the information frame involves an IEEE 802.11ax communication protocol.

9. The electronic device of claim 8, wherein, when using the scheduled-access technique with the non-primary channel, the electronic device is non-backwards compatible with other IEEE 802.11 communication protocols; and wherein, when using one of the channel access technique with the primary channel and the scheduled-access technique with the primary channel, the electronic device is backwards compatible with the other IEEE 802.11 communication protocols.

10. A method for communicating a frame, wherein the method comprises:

by an electronic device:
using physical layer in an interface circuit of the electronic device:
transmitting, to an access point, an association request with an information element that specifies:
i) whether the electronic device currently only operates using a bandwidth of 20 MHz,
ii) a preferred 20 MHz channel that the electronic device chooses to operate on, and
iii) whether the electronic device can be assigned by the access point to a non-primary channel; and
receiving, from the access point, an association response that assigns the electronic device to a primary channel or the non-primary channel;
using a media access control (MAC) layer in the interface circuit of the electronic device, providing information specifying a channel access mode of the electronic device to the physical layer in the interface circuit, wherein the channel access mode indicates to the physical layer to transmit using:
a scheduled-access technique when communicating, in a multi-user (MU) physical layer convergence protocol (PLCP) protocol data unit (MU-PPDU), a frame via the non-primary channel and without using the primary channel;
a contention-based channel access technique when communicating, in a single-user PPDU (SU-PPDU), the frame via the primary channel; and
the scheduled-access technique when communicating, in another MU-PPDU, the frame using the primary channel; and
using the physical layer, transmitting an information frame with the information specifying the channel access mode of the electronic device to an access point, using a Quality of Service (QoS) queue-size field value reserved for an unspecified queue size.

11. The method of claim 10, further comprising:
using the physical layer, transmitting another information frame to renegotiate the channel access mode, wherein the another information frame includes additional information that specifies:
i) whether the electronic device currently only operates using a bandwidth of 20 MHz,
ii) a preferred 20 MHz channel that the electronic device chooses to operate on, and
iii) whether the electronic device can be assigned by the access point to the non-primary channel.

12. The method of claim 11, wherein the additional information includes one of: a channel index, a resource unit, or both the channel index and the resource unit of a channel to be used by the electronic device.

13. The method of claim 10, wherein, during operation, the physical layer communicates the frame with the access point using the channel access mode.

14. The method of claim 10, wherein, when using one of the scheduled-access technique with the non-primary channel and the scheduled-access technique with the primary channel, the physical layer receives a trigger frame from the access point with scheduling information that groups the electronic device into a common MU-PPDU with at least another electronic device that uses a different channel than the electronic device.

15. The method of claim 14, wherein:
the scheduling information assigns the electronic device and at least the another electronic device to different channels in the common MU-PPDU; and
the scheduling information is redundantly communicated in the different channels.

16. The method of claim 14, wherein:
the scheduling information assigns the electronic device and at least the another electronic device to different channels in the common MU-PPDU; and
the trigger frame includes different scheduling information for the electronic device and at least the another electronic device in different channels.

17. The method of claim 10, wherein communicating the frame and the information frame involves an IEEE 802.11ax communication protocol.

18. The method of claim 17, wherein:
when using the scheduled-access technique with the non-primary channel, the electronic device is non-backwards compatible with other IEEE 802.11 communication protocols; and
when using one of the channel access technique with the primary channel and the scheduled-access technique with the primary channel, the electronic device is backwards compatible with the other IEEE 802.11 communication protocols.

19. A non-transitory computer-readable storage medium storing instructions that, when executed by circuitry of an electronic device, cause the electronic device to perform steps that include:
using physical layer in an interface circuit of the electronic device:
transmitting, to an access point, an association request with an information element that specifies:
i) whether the electronic device currently only operates using a bandwidth of 20 MHz,
ii) a preferred 20 MHz channel that the electronic device chooses to operate on, and
iii) whether the electronic device can be assigned by the access point to a non-primary channel; and
receiving, from the access point, an association response that assigns the electronic device to a primary channel or the non-primary channel;
using a media access control (MAC) layer in the interface circuit of the electronic device, providing information specifying a channel access mode of the electronic device to the physical layer in the interface circuit, wherein the channel access mode indicates to the physical layer to transmit using:

a scheduled-access technique when communicating, in a multi-user (MU) physical layer convergence protocol (PLCP) protocol data unit (MU-PPDU), a frame via the non-primary channel and without using the primary channel;

a contention-based channel access technique when communicating, in a single-user PPDU (SU-PPDU), the frame via the primary channel; and the scheduled-access technique when communicating, in another MU-PPDU, the frame using the primary channel; and using the physical layer, transmitting an information frame with the information specifying the channel access mode of the electronic device to an access point, using a Quality of Service (QoS) queue-size field value reserved for an unspecified queue size.

20. The non-transitory computer-readable storage medium of claim 19, wherein execution of the instructions further causes the electronic device to:

transmit, using the physical layer, another information frame to renegotiate the channel access mode, wherein the another information frame includes additional information that specifies:

i) whether the electronic device currently only operates using a bandwidth of 20 MHz, ii) a preferred 20 MHz channel that the electronic device chooses to operate on, and iii) whether the electronic device can be assigned by the access point to the non-primary channel.

* * * * *

UNITED STATES PATENT AND TRADEMARK OFFICE
CERTIFICATE OF CORRECTION

PATENT NO. : 10,594,450 B2
APPLICATION NO. : 15/432758
DATED : March 17, 2020
INVENTOR(S) : Li et al.

It is certified that error appears in the above-identified patent and that said Letters Patent is hereby corrected as shown below:

In the Specification

At Column 28, Line 31-32: "(which is sometimes referred to as 'RE control), there is information in the HE control to indicate a receive operation-mode indication." should read -- (which is sometimes referred to as 'HE control'), there is information in the HE control to indicate a receive operation-mode indication. --.

Signed and Sealed this
Nineteenth Day of April, 2022

Katherine Kelly Vidal
*Director of the United States Patent and Trademark Office*